United States Patent
Jagoda et al.

(10) Patent No.: US 11,255,359 B2
(45) Date of Patent: Feb. 22, 2022

(54) PUMP/MOTOR WITH INTEGRATED VARIATOR FOR USE IN HYDRAULIC SYSTEMS

(71) Applicant: EATON INTELLIGENT POWER LIMITED, Dublin (IE)

(72) Inventors: Aaron Hertzel Jagoda, Bloomington, MN (US); Eric Joseph Mann, Minnetonka, MN (US)

(73) Assignee: DANFOSS POWER SOLUTIONS II TECHNOLOGY A/S, Nordborg (DK)

( * ) Notice: Subject to any disclaimer, the term of this patent is extended or adjusted under 35 U.S.C. 154(b) by 0 days.

(21) Appl. No.: 16/480,112

(22) PCT Filed: Jan. 23, 2018

(86) PCT No.: PCT/US2018/014903
§ 371 (c)(1),
(2) Date: Jul. 23, 2019

(87) PCT Pub. No.: WO2018/136960
PCT Pub. Date: Jul. 26, 2018

(65) Prior Publication Data
US 2019/0376536 A1 Dec. 12, 2019

Related U.S. Application Data

(60) Provisional application No. 62/449,266, filed on Jan. 23, 2017, provisional application No. 62/449,280, (Continued)

(51) Int. Cl.
*F16H 3/44* (2006.01)
*F15B 21/08* (2006.01)
(Continued)

(52) U.S. Cl.
CPC .......... *F15B 21/087* (2013.01); *E02F 9/2271* (2013.01); *E02F 9/2289* (2013.01);
(Continued)

(58) Field of Classification Search
CPC ............... F16H 3/54; F16H 3/724; F16H 3/72
See application file for complete search history.

(56) References Cited

U.S. PATENT DOCUMENTS 1,269,909 A 6/1918 Cooper
4,729,717 A 3/1988 Gupta
(Continued)

FOREIGN PATENT DOCUMENTS

DE 102 14 637 A1 10/2003
DE 103 29 215 A1 1/2005
(Continued)

OTHER PUBLICATIONS

Definition of Node, retrieved from www.merriam-webster.com (Year: 2020).*
(Continued)

*Primary Examiner* — Stacey A Fluhart
(74) *Attorney, Agent, or Firm* — Merchant & Gould, P.C.

(57) ABSTRACT

A variator includes an epicyclic gear set that has at least three nodes. The variator includes a pumping unit connected to a first node of the epicyclic gear set. The variator includes a clutch connected to a second node of the epicyclic gear set. The clutch is selectively movable between three positions. When in the first position, the clutch allows the second node to freewheel. When in the second position, the clutch connects the second node to a fixed surface. When in the third position, the clutch connects the second node to an electric motor. The variator includes a receiver connected to the third node of the epicyclical gear set. The receiver is configured to receive a drive shaft.

6 Claims, 33 Drawing Sheets

Related U.S. Application Data filed on Jan. 23, 2017, provisional application No. 62/449,291, filed on Jan. 23, 2017, provisional application No. 62/449,297, filed on Jan. 23, 2017, provisional application No. 62/449,301, filed on Jan. 23, 2017.

(51) Int. Cl.

| | | |
|---|---|---|
| *E02F 9/22* | (2006.01) | |
| *F15B 11/16* | (2006.01) | |
| *H02K 7/108* | (2006.01) | |
| *H02K 7/116* | (2006.01) | |
| *H02K 11/00* | (2016.01) | |
| *F16H 3/72* | (2006.01) | |
| *F16H 47/04* | (2006.01) | |

(52) U.S. Cl.
CPC ............. *F15B 11/165* (2013.01); *F16H 3/44* (2013.01); *F16H 3/724* (2013.01); *H02K 7/108* (2013.01); *H02K 7/116* (2013.01); *H02K 11/0094* (2013.01); *F16H 47/04* (2013.01); *F16H 2200/2005* (2013.01)

(56) References Cited

U.S. PATENT DOCUMENTS

| | | | |
|---|---|---|---|
| 5,360,322 | A | 11/1994 | Henein et al. |
| 7,588,509 | B1 | 9/2009 | Marsha |
| 8,358,042 | B2 | 1/2013 | Yamada et al. |
| 8,876,644 | B2 | 11/2014 | Riegert et al. |
| 9,751,411 | B2 | 9/2017 | Benjey et al. |
| 2010/0270096 | A1* | 10/2010 | Holmes .................. B60K 6/383 180/65.275 |
| 2011/0003660 | A1 | 1/2011 | Gant |
| 2011/0237380 | A1 | 9/2011 | Hiraki et al. |
| 2011/0256972 | A1 | 10/2011 | Greenwood |
| 2013/0102431 | A1* | 4/2013 | Doleschel ................. F16H 3/66 475/151 |
| 2013/0315758 | A1 | 11/2013 | Olson |
| 2015/0037177 | A1* | 2/2015 | Buchholz .................. F01P 5/12 417/319 |
| 2016/0280215 | A1* | 9/2016 | Nishimine ............ B60W 20/20 |
| 2017/0101907 | A1* | 4/2017 | Kang ........................ F01M 1/02 |
| 2019/0186418 | A1* | 6/2019 | Azundah ................... F02K 3/06 |
| 2019/0249724 | A1* | 8/2019 | Kirkwood ............ F16D 13/648 |

FOREIGN PATENT DOCUMENTS

| | | |
|---|---|---|
| DE | 10 2006 041 687 A1 | 3/2008 |
| DE | 10 2014 212 325 A1 | 12/2015 |
| EP | 0 819 848 A2 | 1/1998 |
| EP | 0 819 848 B1 | 6/2003 |
| EP | 1 578 007 A2 | 9/2005 |
| JP | 2005-291330 A | 10/2005 |
| WO | 2008/033378 A1 | 3/2008 |

OTHER PUBLICATIONS

Extended European Search Report for corresponding European Patent Application No. 18741617.7 dated Sep. 17, 2020, 7 pages.
International Search Report and Written Opinion of the International Searching Authority for corresponding International Patent Application No. PCT/US2018/014903 dated May 23, 2018, 11 pages.
Davin, T. et al., "Experimental study of oil cooling systems for electric motors", Applied Thermal Engineering, 75: 1-13 (2015).
Fiebig, W, et al., "A vane pump integrated with an electric motor", 9th International Fluid Power Conference, 1-13 (2014).
Janjic, B. et al., "Design of PM integrated motor-drive system for axial pumps", Conference on Power Electronics & Applications, 1-10 (2007).
"Voith Turbo H 30 L Hydraulic Products and Applications", Voith Turbo, Voith Turbo H & L Hydraulic GmbH & Co. KG, 1-24 (2010).

\* cited by examiner

PUMP/MOTOR WITH INTEGRATED VARIATOR FOR USE IN HYDRAULIC SYSTEMS

CROSS-REFERENCE TO RELATED APPLICATIONS

This application is a National Stage Application of PCT/US2018/014903, filed on Jan. 23, 2018, which claims the benefit of U.S. Patent Application Serial Nos. 62/449,280; 62/449,301; 62/449,266; 62/449,291; and 62/449,297, all of which were filed on Jan. 23, 2017, the disclosures of which are incorporated herein by reference in their entireties. To the extent appropriate, a claim of priority is made to each of the above disclosed applications.

BACKGROUND

Mobile pieces of machinery (e.g., excavators, tractors, wheel loaders, concrete pump trucks, etc.) often include hydraulic systems having hydraulically powered linear and rotary actuators used to power various active machine components (e.g., linkages, tracks, rotating joints, etc.). Typically, the linear actuators include hydraulic cylinders and the rotary actuators include hydraulic motors. By accessing a user interface of a machine control system, a machine operator can control movement of the various machine components.

A typical piece of mobile machinery includes a prime mover (e.g., a diesel engine, spark ignition engine, electric motor, etc.) that functions as an overall source of power for the piece of mobile machinery. Commonly, the prime mover powers one or more hydraulic pumps that provide pressurized hydraulic fluid for driving the active machine components of the piece of machinery. The prime mover is typically required to be sized to satisfy a peak power requirement of the system. Because the prime mover is designed to satisfy peak power requirements, the prime mover often does not operate at peak efficiency under average working loads.

The operation of the active hydraulic components of the type described above can be characterized by frequent accelerations and decelerations (e.g., overrunning hydraulic loads). Due to throttling, there is often substantial energy loss associated with decelerations. Further, additional hydraulic fluid flow is sometimes required by components to maintain productivity in mobile machines when prime mover down-speeding is being employed to improve fuel consumption.

Existing hydraulic energy recovery systems can be costly and lack efficiency. Further, such systems also suffer from reliability concerns and often lack the flexibility to recover energy from multiple sources simultaneously or individually. This limits the amount of energy that can be recovered and reused, which affects the usefulness of the system. There is a need for improved systems for recovering energy.

SUMMARY

One aspect of the present disclosure relates to systems and methods for effectively recovering and utilizing energy from overrunning hydraulic loads. The present disclosure allows overrunning energy to be recovered efficiently from multiple sources at any time. Such recovered energy can be stored electrically in an electric storage device such as a battery, capacitors, or a combination of the two. Alternatively, the recovered energy can be used to power other components.

The present disclosure also allows a load placed on the prime mover (i.e., engine) by a pump of a hybrid variator to be leveled such that the prime mover can operate a generally constant power level. This can be accomplished by using a motor-generator of the hybrid variator to generate electricity and store such electricity in an electric storage device during periods of low prime mover load and use that stored energy later to reduce the power at times of higher loading.

In another example of the present disclosure, a variator is disclosed. The variator includes an epicyclic gear set that has at least three nodes. The variator includes a pumping unit connected to a first node of the epicyclic gear set. The variator includes a clutch connected to a second node of the epicyclic gear set. The clutch is selectively movable between three positions. When in the first position, the clutch allows the second node to freewheel. When in the second position, the clutch connects the second node to a fixed surface. When in the third position, the clutch connects the second node to an electric motor. The variator includes a receiver connected to the third node of the epicyclical gear set. The receiver is configured to receive a drive shaft.

In another example of the present disclosure, a variator is disclosed. The variator includes a housing and a planetary gear set positioned within the housing. The planetary gear set has at least a sun gear, a ring gear, and a planetary carrier. The variator includes an axial hydraulic piston pump that has a variable displacement and is connected to the planetary carrier of the planetary gear set. The axial hydraulic piston pump has a pump shaft, a swash plate, and a rotating group. The rotating group has a plurality of pistons connected to the swash plate for varying the angle of the swash plate. The axial hydraulic piston pump is positioned within the housing. The variator includes an electric motor positioned within the housing. The electric motor has a stator and a rotatable rotor. The rotatable rotor is positioned around the axial hydraulic piston pump within the housing. The variator includes a clutch that is connected to the ring gear of the planetary gear set. The clutch is selectively movable between three positions. When in the first position, the clutch allows the ring gear to freewheel. When in the second position, the clutch connects the ring gear to the housing of the variator. When in the third position, the clutch connects the ring gear to the rotor of the electric motor. The variator includes a receiver connected to the sun gear of the planetary gear set. The receiver is configured to receive a drive shaft.

In another example of the present disclosure, a variator is disclosed. The variator includes a housing and a planetary gear set positioned within the housing. The planetary gear set has at least a sun gear, a ring gear, and a planetary carrier. The variator includes an axial hydraulic piston pump that has a variable displacement and is connected to the planetary carrier of the planetary gear set. The axial hydraulic piston pump has a pump shaft, a swash plate, and a rotating group. The rotating group has a plurality of pistons connected to the swash plate for varying the angle of the swash plate. The axial hydraulic piston pump is positioned within the housing. The variator includes an electric motor-generator that has a stator positioned around a rotatable rotor. The electric motor-generator is positioned external of the housing. The variator includes a clutch that is connected to the ring gear of the planetary gear set. The clutch is selectively movable between three positions. When in the first position, the clutch allows the ring gear to freewheel. When in the second position, the clutch connects the ring gear to the housing of the variator. When in the third position, the clutch connects the ring gear to the rotor of the electric motor. The variator includes a receiver connected to the sun gear of the planetary gear set. The receiver is configured to receive a drive shaft.

In another aspect of the present disclosure, a motor energy recovery system is disclosed. The motor energy recovery system includes an electric storage device used to store an electric charge, a hydraulic circuit, and a variator. The variator includes an epicyclic gear set that has at least three nodes. The variator includes a pump connected to a first node of the epicyclic gear set. The pump has a first side that fluidly connects to the hydraulic circuit and a second side that fluidly connects to a tank. The variator includes a motor-generator connected to the electric storage device. The motor-generator is connectable to the epicyclic gear set. The variator includes a clutch connected to a second node of the epicyclic gear set. The clutch is selectively movable between three positions. When in a first position, the clutch allows the second node to freewheel. When in a second position, the clutch connects the second node to a fixed surface. When in the third position, the clutch connects the second node to the motor-generator. The motor energy recovery system includes a rotational load connected to the third node of the epicyclic gear set of the variator. The variator is configured to receive energy from the hydraulic circuit, the rotational load, and the electric storage device, and the variator is also configured to output energy to the hydraulic circuit, the rotational load, and the electric storage device.

In another aspect of the present disclosure, a motor energy recovery system is disclosed. The motor energy recovery system includes a battery and a hydraulic circuit. The hydraulic circuit includes a main pump being in fluid communication with at least one linear mechanical load. The motor energy recovery system includes a variator. The variator includes an epicyclic gear set that has at least three nodes. The variator includes a pump connected to a first node of the epicyclic gear set. The pump has a first side that fluidly connects to the hydraulic circuit and a second side that fluidly connects to a tank. The variator includes a motor-generator connected to an electric storage device. The motor-generator is connectable to the epicyclic gear set. The variator includes a clutch connected to a second node of the epicyclic gear set. The clutch is selectively movable between three positions. When in a first position, the clutch allows the second node to freewheel. When in a second position, the clutch connects the second node to a fixed surface. When in the third position, the clutch connects the second node to the motor-generator. The motor energy recovery system includes a rotary mechanical load connected to the third node of the epicyclic gear set of the variator. The variator is configured to receive energy from the hydraulic circuit, the rotary mechanical load, and the battery. The variator is configured to output energy to the hydraulic circuit, the rotary mechanical load, and the battery.

In another aspect of the present disclosure, a motor energy recovery system is disclosed. The motor energy recovery system includes a battery and a hydraulic circuit. The hydraulic circuit includes a main pump being in fluid communication with at least one linear mechanical load. The motor energy recovery system includes a variator. The variator includes an epicyclic gear set that has at least three nodes. The variator includes a pump connected to a first node of the epicyclic gear set. The pump has a first side that fluidly connects to the hydraulic circuit and a second side that fluidly connects to a tank. The variator includes a motor-generator connected to an electric storage device. The motor-generator is connectable to the epicyclic gear set. The variator includes a clutch connected to a second node of the epicyclic gear set. The clutch is selectively movable between three positions. When in a first position, the clutch allows the second node to freewheel. When in a second position, the clutch connects the second node to a fixed surface. When in the third position, the clutch connects the second node to the motor-generator. The motor energy recovery system includes a prime mover connected to the third node of the epicyclic gear set of the variator. The variator is configured to receive energy from the hydraulic circuit, the prime mover, and the battery. The variator is configured to output energy to the hydraulic circuit, the prime mover, and the battery. The motor energy recovery system includes a control system in communication with the variator to alter the behavior of the variator between a plurality of operating modes. The plurality of operating modes alter whether the variator receives energy from the hydraulic circuit, the prime mover, and/or electric storage device and outputs energy to the hydraulic circuit, the prime mover, and/or electric storage device.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular examples of the present disclosure and therefore do not limit the scope of the present disclosure. The drawings are not to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
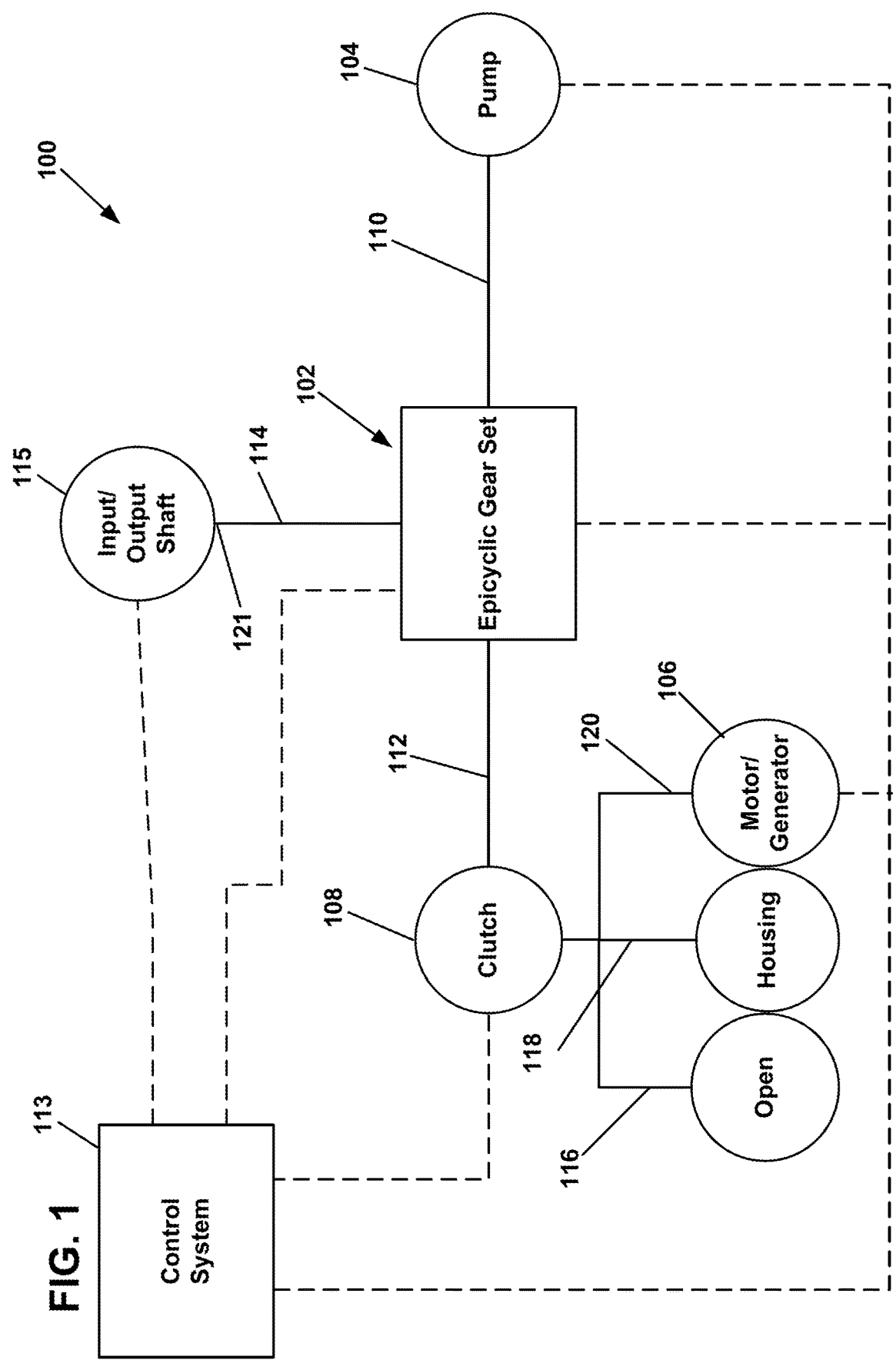
FIG. 1 illustrates a schematic of a hybrid variator, according to one example of the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims.

The system disclosed herein has several advantages. Because of the unique architecture of the disclosed system, the size, and therefore cost, of many of the components can be lowered. This is an advantage over many electric solutions, which often carry high costs due to the large electric motors that are required.

FIG. 1 is a schematic representation a hybrid variator 100. The variator 100 includes an epicyclic gear set 102, a variator pump 104, a motor-generator 106, and a clutch 108. As shown, the individual components of the variator 100 are interconnected by the epicyclic gear set 102. The epicyclic gear set 102 includes at least three nodes: a first node 110, a second node 112, and a third node 114. In some examples, the variator also include a control system 113.

Components can be connected to the various nodes 110, 112, 114 of the epicyclic gear set 102 in a variety of different ways to achieve different gear ratios. In the example shown, the variator pump 104 is connected to the first node 110, the clutch 108 is connected to the second node 112, and a receiver 121 for connecting an input/output shaft 115 can be connected to the third node 114. In some examples, the epicyclic gear set 102 is a planetary gear set that includes a sun gear, a ring gear, and a planetary carrier. A variety of other different combinations of attaching components to the nodes 110, 112, 114 of the epicyclic gear set 102 can be achieved, and is considered within the scope of the present disclosure. Further, a gear set having more than three nodes or less than three nodes can also be implemented.

In some examples, the variator pump 104 is a pump and a motor and configured to both transform mechanical power to hydraulic power and also transform hydraulic power to mechanical power.

In some examples, the variator pump 104, motor-generator 106, clutch 110, and epicyclic gear set 102 can be contained within a singular variator housing (not shown).

The clutch 108 is selectively movable between three positions. In the first position 116, the clutch 108 allows the second node 112 to be open, or freewheel. When in the second position 118, the clutch 108 connects the second node 112 to a fixed surface, such as a housing. When in the third position 120, the clutch 108 connects the second node 112 to the motor-generator 106. In some examples, a second clutch is used in conjunction with clutch 108.

In some examples, the control system 113 is in communication with the variator 100. In some examples, the control system 113 monitors and/or controls the behavior of the variator 100 either automatically or based on a input from the user. In some examples, the control system 113 monitors the performance of the epicyclic gear set 102, pump 104, motor-generator 106, clutch 108, and/or input/output shaft 115. In some examples, the control system 113 is in control of the operation of the clutch 108 so to cycle the clutch between the first 116, second 118 and third positions 120. In some examples, the control system 113 is operable to execute a plurality of software instructions that, when executed, cause the variator 100 to implement the methods, and otherwise operate to have functionality the variator as described herein. The control system 113 can include a device commonly referred to as a microprocessor, central processing unit (CPU), digital signal processor (DSP), or other similar device and may be embodied as a standalone unit or as a device shared with components of the hydraulic system 100. The control system 113 may include memory for storing the software instructions or the variator 100 may further comprise a separate memory device for storing the software instructions that is electrically connected to the control system 113 for the bi-directional communication of the instructions, data, and signals therebetween.

Figure 2:
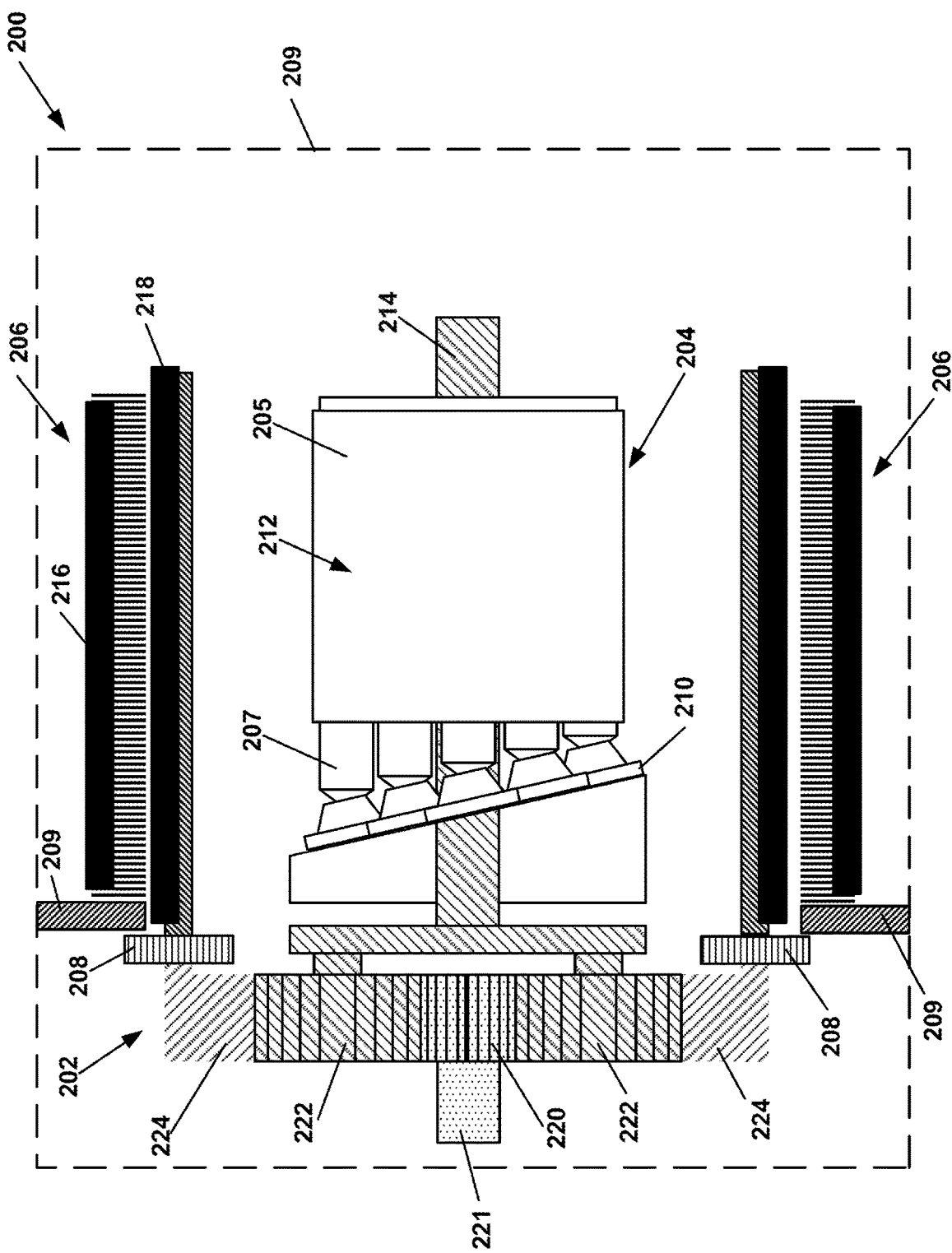
FIG. 2 illustrates a second schematic cross-section of a hybrid variator, according to one example of the present disclosure.

FIG. 2 shows a schematic cross-section of a variator 200, according to one example of the present disclosure. The variator 200 includes an epicyclic gear set 202, a variator pump 204, a motor-generator 206, and a clutch 208.

In some examples, the variator pump 204 is a bi-directional over-the-center pump having a variable displacement. In the depicted example, the variator pump 204 is an axial piston pump of fixed or variable displacement. In some examples, the variator pump 204 is a pump and a motor and configured to both transform mechanical power to hydraulic power and also transform hydraulic power to mechanical power.

The variator pump 204 includes a swash plate 210, a rotating group 212, and a pump shaft 214. The rotating group 212 (e.g., cylinder block 205 and pistons 207) rotates with the pump shaft 214. In some examples, the swash plate 210 can be positioned at different angles relative to the pump shaft 214 to change the amount of pump displacement per each shaft rotation. The volume of hydraulic fluid displaced across the variator pump 204 per rotation of the pump shaft 214 can be varied by varying the angle of the swash plate 210 corresponding to the given pump/motor unit. Varying the angle of the swash plate 210 also changes the torque transferred between the pump shaft 214 and the rotating group 212 of the variator pump 204. When the swash plate 210 is aligned perpendicular to the pump shaft 214, no hydraulic fluid flow is directed through the variator pump 204. The swash plate 210 can be an over-the-center swash plate that allows for bi-directional rotation of the pump shaft 214. In some examples, the swash plate 210 is fixed to allow a fixed displacement of the variator pump 204.

As shown, the motor-generator 206 is an electric motor-generator including a stator 216 and a rotor 218. During operation of the variator 200, the electric motor-generator 206 can function as a motor and provide rotational power to the epicyclic gear set 202. Alternatively, the electric motor-generator 206 can function as a generator when receiving power from epicyclic gear set 202, transforming such power into electricity.

The stator 216 and rotor 218 have generally circular cross-sections. The rotor 218 is rotatable and includes a plurality of permanent magnets. The stator 216 is shown to be stationary and includes a plurality of conductors, such as wire windings. In the depicted example, the stationary stator 216 is shown positioned around the rotating rotor 218. Further, the rotor 218 is shown positioned around the variator pump 204. Such positioning of the electric motor-generator 206 and variator pump 204 allows the variator 200 to remain compact in size. In some examples, the stator 216 is cooled by the hydraulic oil present in a housing 209 surrounding the variator 200.

The epicyclic gear set 202 shown is a planetary gear set including a sun gear 220, a planetary carrier 222, and a ring gear 224. As shown, the variator pump 204 is connected to the planetary carrier 222, the ring gear 224 is connected to the clutch 208, and the sun gear 220 is connectable to an external input/output shaft via a receiver 221. Alternatively, the variator pump 204, clutch 208, and external input/output shaft can be connected to the epicyclic gear set 202 in a variety of different ways to achieve different gear ratios.

The clutch 208, similar to the clutch 108 described above, is selectively movable between three positions. In a first position, the clutch 208 allows the ring gear 224 to be open, or freewheel. When in a second position, the clutch 108 connects the ring gear 224 to a fixed surface, such as the housing 209. When in a third position, the clutch 208 connects the ring gear to the motor-generator 206, specifically the rotatable rotor 218. In some examples, a second clutch is used in conjunction with the clutch 208.

Figure 3:
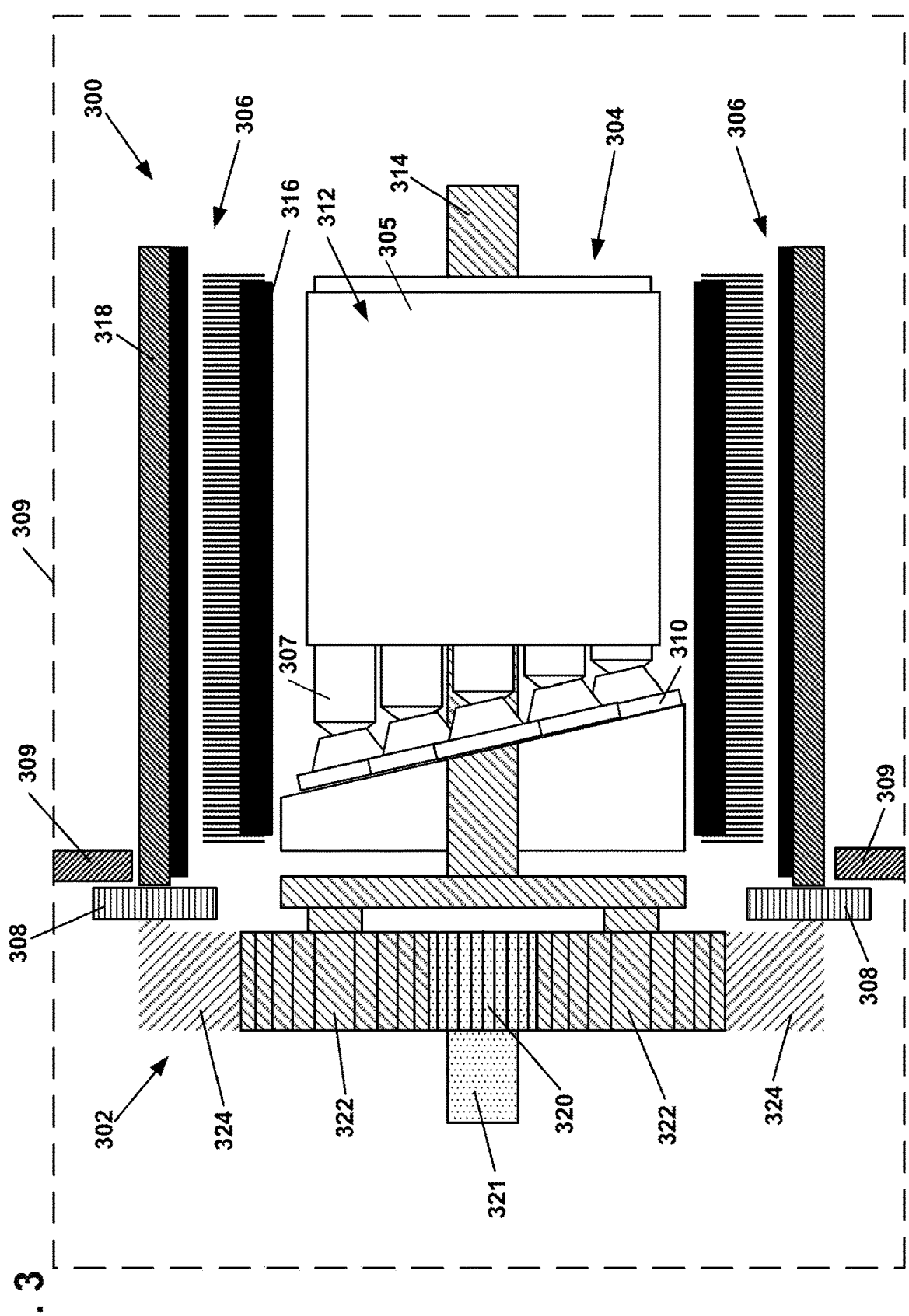
FIG. 3 illustrates a third schematic cross-section of a hybrid variator, according to one example of the present disclosure.

FIG. 3 shows a schematic cross-section of a variator 300, according to another example of the present disclosure. The variator 300 is substantially similar to the variators 100, 200 described above. Specifically, the variator 300 includes an epicyclic gear set 302, a variator pump 304, a motor-generator 306, and a clutch 308.

The variator pump 304 includes a swash plate 310, a rotating group 312, and a pump shaft 314. The rotating group 312 (e.g., cylinder block 305 and pistons 307) rotates with the pump shaft 314.

As shown, the motor-generator 306 is an electric motor-generator including a stator 316 and a rotor 318. The rotor 318 is rotatable and includes a plurality of permanent magnets. The stator 316 is shown to be stationary and includes a plurality of conductors, such as wire windings. Differing from the motor-generator 206 described above, in the depicted example, the rotating rotor 318 is shown positioned around the stationary stator 316. Further, the stator 316 is shown positioned around the variator pump 304. Such positioning of the electric motor-generator 306 and variator pump 304 allows the variator 300 to remain compact in size. In some examples, the stator 316 is cooled by the hydraulic oil present in a housing 309 surrounding the variator 300.

The epicyclic gear set 302, like the gear set 202 described above, is a planetary gear set including a sun gear 320, a planetary carrier 322, and a ring gear 324. As shown, the variator pump 304 is connected to the planetary carrier 322, the ring gear 324 is connected to the clutch 308, and the sun gear 320 is connectable to an external input/output shaft via a receiver 321. Alternatively, the variator pump 304, clutch 308, and external input/output shaft can be connected to the epicyclic gear set 302 in a variety of different ways to achieve different gear ratios.

The clutch 308, similar to the clutches 108, 208 described above, is selectively movable between three positions. In a first position, the clutch 308 allows the ring gear 324 to be open, or freewheel. When in a second position, the clutch 308 connects the ring gear 324 to a fixed surface, such as the housing 309. When in a third position, the clutch 308 connects the ring gear to the motor-generator 306, specifically the rotatable rotor 318. In some examples, a second clutch is used in conjunction with the clutch 308.

Figure 4:
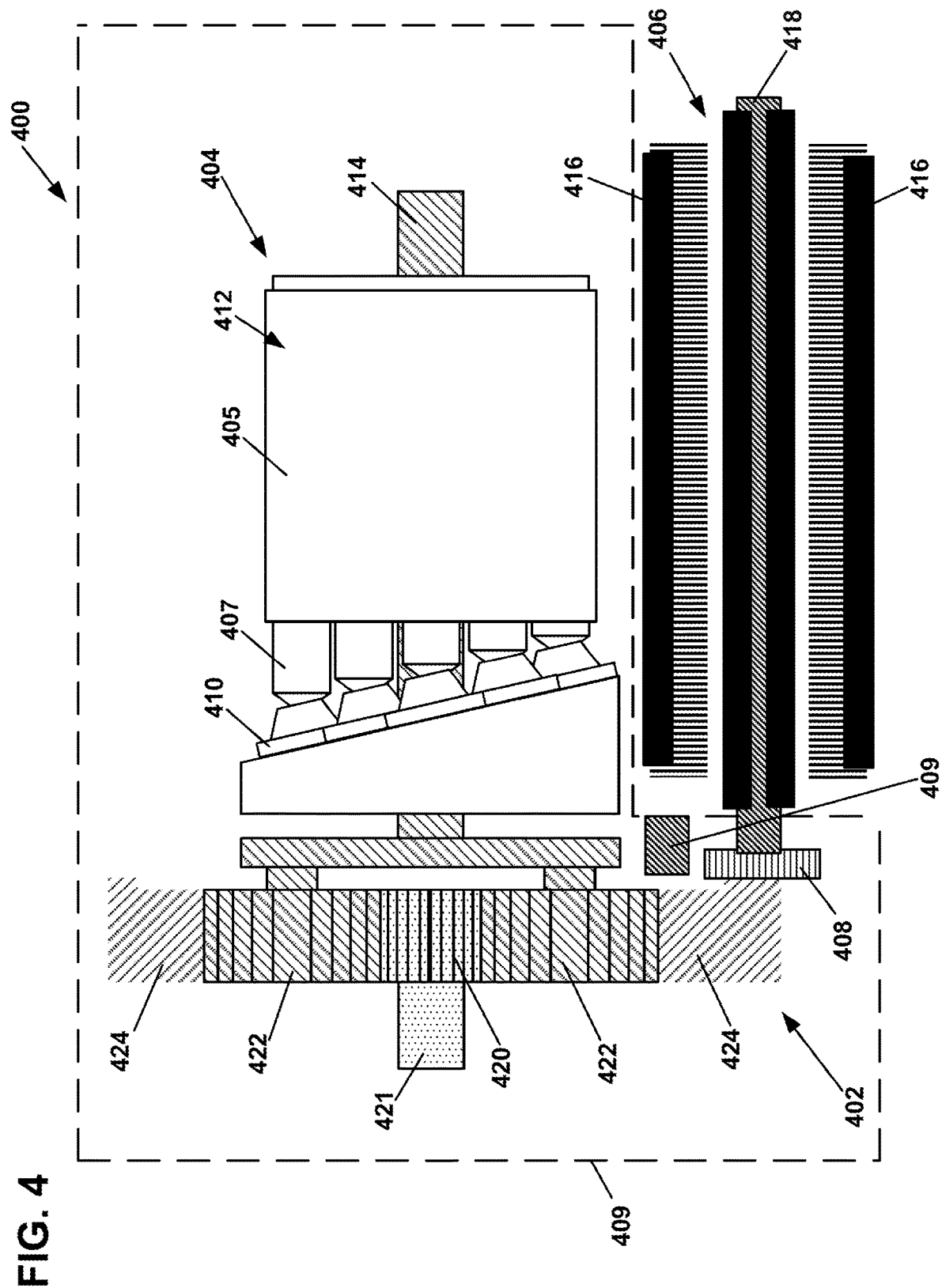
FIG. 4 illustrates a fourth schematic cross-section of a hybrid variator, according to one example of the present disclosure

FIG. 4 shows a schematic cross-section of a variator 400, according to another example of the present disclosure. The variator 400 is substantially similar to the variators 100, 200, 300 described above. Specifically the variator includes an epicyclic gear set 402, a variator pump 404, a motor-generator 406, and a clutch 408. In some examples, the variator pump 404, clutch 408, and epicyclic gear set 402 can be contained within a singular variator housing 409.

In some examples, the variator pump 404 is a bi-directional over-the-center pump having a variable displacement. In the depicted example, the variator pump 404 is an axial piston pump of fixed or variable displacement. The variator pump 404 includes a swash plate 410, a rotating group 412, and a pump shaft 414. The rotating group 412 (e.g., cylinder block 405 and pistons 407) rotates with the pump shaft 414.

As shown, the motor-generator 406 is positioned external to the housing 409. The motor-generator 406 is an electric motor-generator including a stator 416 and a rotor 418. During operation of the variator 400, the electric motor-generator 406 can function as a motor and provide rotational power to the epicyclic gear set 402. Alternatively, the electric motor-generator 406 can function as a generator when receiving power from the epicyclic gear set 402, transforming such power into electricity.

The stator 416 and rotor 418 have generally circular cross-sections. The rotor 418 is rotatable and includes a plurality of permanent magnets. The stator 416 is shown to be stationary and includes a plurality of conductors, such as wire windings. In the depicted example, the stationary stator 416 is shown positioned around the rotating rotor 418. In some examples, the variator 400 can include multiple motor-generators 406 in communication with the clutch 408. This solution gives the user flexibility to customize the variator 400 by adding multiple motor-generators 406 to increase electric power/generation.

The epicyclic gear set 402 shown is a planetary gear set including a sun gear 420, a planetary carrier 422, and a ring gear 424. As shown, the variator pump 404 is connected to the planetary carrier 422, the ring gear 424 is connected to the clutch 408, and the sun gear 420 is connectable to an external input/output shaft via a receiver 421. Alternatively, the variator pump 404, clutch 408, and external input/output shaft can be connected to the epicyclic gear set 402 in a variety of different ways to achieve different gear ratios.

The clutch 408, similar to the clutches 108, 208, 308 described above, is selectively movable between three positions. In a first position, the clutch 408 allows the ring gear 424 to be open, or freewheel. When in a second position, the clutch 408 connects the ring gear 424 to a fixed surface, such as the housing 409. When in a third position, the clutch 408 connects the ring gear to the motor-generator 406, specifically the rotatable rotor 418. In some examples, a second clutch is used in conjunction with the clutch 408.

In some examples, the variators 100, 200, 300, 400 use the gear sets 102, 202, 302, 402 to receive power from the electric motor-generators 106, 206, 306, 406 and/or an external input/output shaft to allow the input speed of the variator pumps 104, 204, 304, 404 to be varied. In other examples, the variators 100, 200, 300, 400 are configured to use power from electric motor-generators 106, 206, 306, 406 and/or the variator pumps 104, 204, 304, 404 to control the output speed of an external input/output shaft attached to the third node 114, sometimes via the sun gear 220, 320, 420. In still other examples, the variators 100, 200, 300, 400 are configured to receive power from the variator pumps 104, 204, 304, 404 and/or external input/output shaft at the third node 114, sometimes via the sun gear 220, 320, 420, to operate the electric motor-generators 106, 206, 306, 406 as generators to generate electricity.

Figure 5:
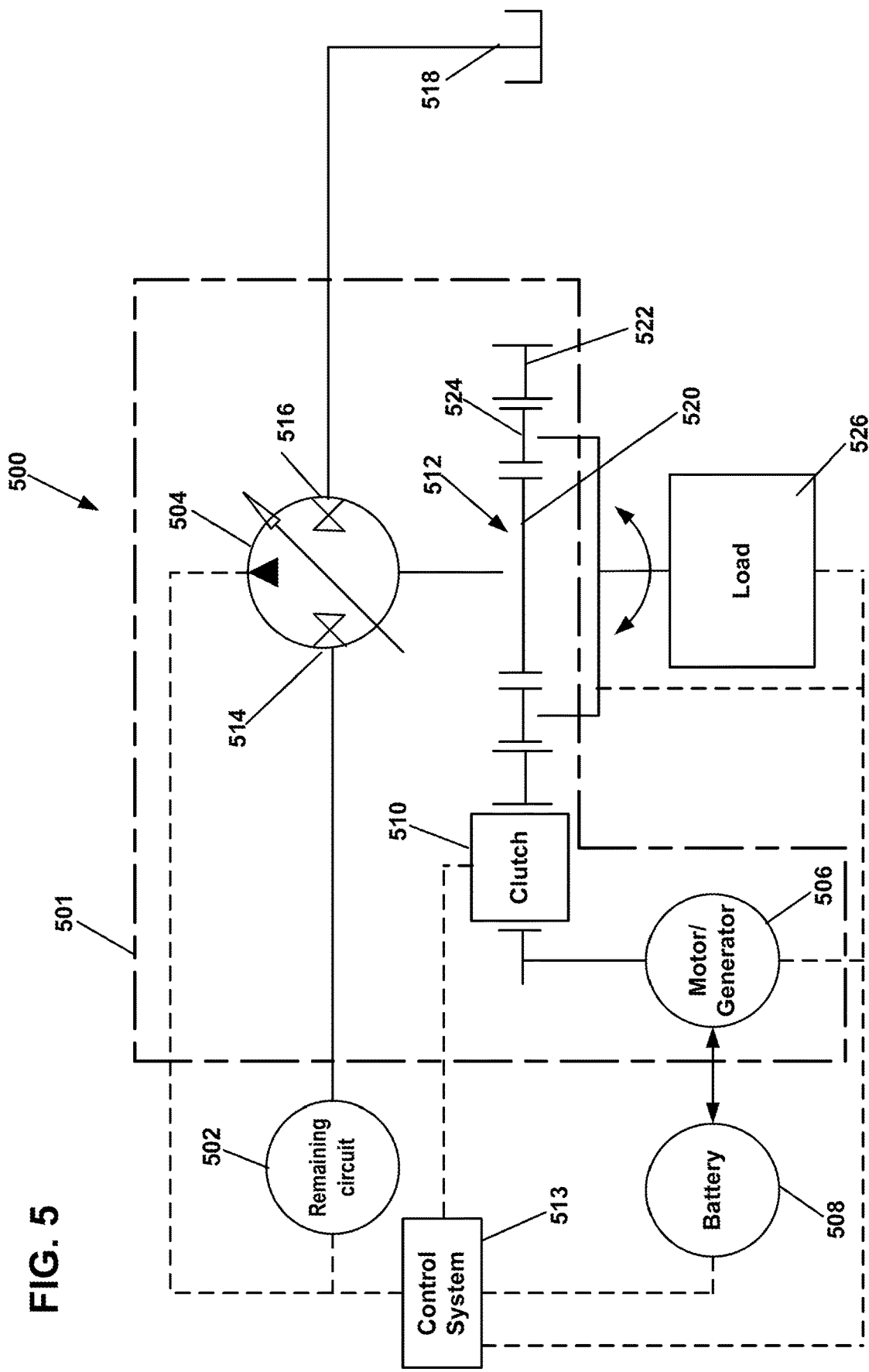
FIG. 5 illustrates a schematic view of an energy recovery system having a pump/motor with an integrated variator, according to one embodiment of the present disclosure.

FIG. 5 is a schematic representation of a hydraulic energy recovery system 500. The system includes a hydraulic circuit 502, a variator pump 504, a motor-generator 506, a battery 508, a clutch 510, an epicyclic gear set 512, and a control system 513. In some embodiments, the variator pump 504, motor-generator 506, clutch 510, and epicyclic gear set 512 can be contained within a singular variator housing (not shown). As shown, the variator pump 504, motor-generator 506, clutch 510, and epicyclic gear set 512 can be referred to as a variator 501.

As shown, the variator pump 504 is connected at a first side 514 to the hydraulic circuit 502 and at a second side 516 to a tank 518. In some embodiments, the pump includes a housing. In still other embodiments, the variator pump 504 is a bidirectional over center pump having a variable displacement. In some embodiments, the pump is an axial piston pump of fixed or variable displacement. In some embodiments, the variator pump 504 is a pump and a motor and configured to both transform mechanical power to hydraulic power and also transform hydraulic power to mechanical power.

The motor-generator 506 is shown connected to the clutch 510. In some embodiments, the motor-generator 506 is an electric motor. During operation of the system 500, the motor-generator 506 can function as a motor and provide rotational power to the epicyclic gear set 512. Conversely, the motor-generator 506 can function as a generator when receiving power from the epicyclic gear set 512, transforming such power into electrical energy to be stored in the battery 508.

The battery 508 can be used to store electrical energy produced by the system 500. The electrical energy that is stored can be a product of overrunning energy produced by the hydraulic system 500 or a rotational load 526 and transformed into electrical energy by way of the variator pump 504 and motor-generator 506. In some embodiments, the battery 508 is a capacitor or other similar device used to store electrical energy.

The epicyclic gear set 512 is shown to have a first node 520, a second node 522, and a third node 524. Components can be connected to the various nodes of the epicyclic gear set 512 in a variety of different ways to achieve different gear ratios. In the example shown, the variator pump 504 is connected to the first node 520, the clutch 510 is connected to the second node 522, and the rotational external load 526 is connected to the third node 524. In some embodiments, the epicyclic gear set 512 is a planetary gear set that includes a sun gear, a ring gear, and a planetary carrier. A variety of other different combinations of attaching components to the nodes of the epicyclic gear set 512 can be achieved, and is considered within the scope of the present disclosure. Further, a gear set having more than three nodes or less than three nodes can also be implemented.

The clutch 510 is selectively movable between three positions. In the first position, the clutch 510 allows the second node 522 to be open, or freewheel (e.g., rotate with limited resistance not connected to another structure). When in the second position, the clutch 510 connects the second node 522 to a fixed surface, such as a housing. When in the third position, the clutch 510 connects the second node 522 to the motor-generator 506. In some embodiments, a second clutch is used in conjunction with clutch 510.

The control system 513 is in communication with the hydraulic circuit 502, battery 508, variator 501 (e.g., variator pump 504, motor-generator 506, clutch 510, and epicyclic gear set 512) and load 526. In some examples, the control system 513 is in direct communication with the clutch 510 to cycle the clutch between the first, second, and third positions. In some examples, the control system 513 monitors and/or controls the behavior of the components of the system 500 automatically or based on a manual input from the user. In some examples, the control system 513 is operable to execute a plurality of software instructions that, when executed, cause the system 513 to implement the methods and otherwise operate to have functionality as described herein. The control system 513 can include a device commonly referred to as a microprocessor, central processing unit (CPU), digital signal processor (DSP), or other similar device and may be embodied as a standalone unit or as a device shared with components of the hydraulic system 500. The control system 513 may include memory for storing the software instructions, or the system 500 may further comprise a separate memory device for storing the software instructions that is electrically connected to the control system 513 for the bi-directional communication of the instructions, data, and signals therebetween.

Figure 6:
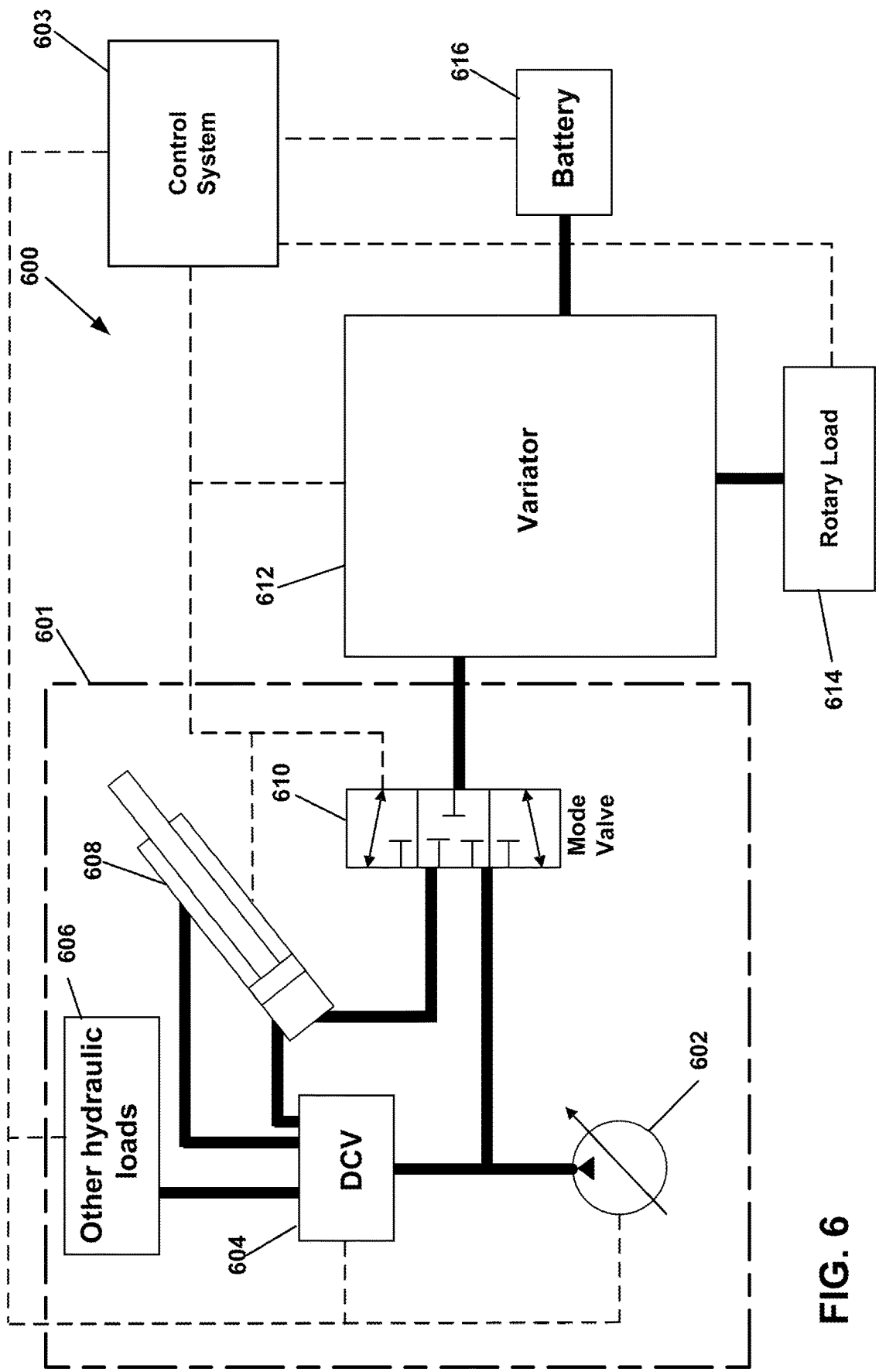
FIG. 6 illustrates a schematic application of an energy recovery system having a pump/motor with an integrated variator, according to one embodiment of the present disclosure.

FIG. 6 shows a schematic of a system 600 according to one embodiment of the present disclosure. The system 600 is similar to the system 500. The system 600 includes a hydraulic circuit 601 that includes a main pump 602, a directional control valve (DCV) 604, general hydraulic system loads 606, a linear mechanical load 608, and a mode valve 610. The system also includes a variator 612, a rotary mechanical load 614, and a battery 616. The main pump 602 provides fluid flow to the system 600. The DCV 604 receives fluid flow from the main pump 602 and directs it to a variety of components in the system 600, such as the general system loads 606 and the linear mechanical load 608. Further, the mode valve 610 of the system 600 controls the direction of fluid flow to and from the variator 612.

In some examples, the linear mechanical load 608 is a hydraulic load within the system 600. Specifically, in some examples, the linear mechanical load 608 is a hydraulic actuator.

In some examples, the variator 612 is substantially similar to the variator 501 described above, complete with an epicyclic gear set, motor-generator, and pump.

The variator 612 can operate as a pump or a motor. In some embodiments, the variator 612 includes a variable or fixed displacement pump, a motor-generator, a clutch, and an epicyclic gear set, similar to those described above with respect to the system 500. In some embodiments, the variator 612's motor-generator is an electric motor. In some embodiments, the variator 612 is contained within a single housing. In other embodiments, the variator 612 comprises a plurality of individually housed components. As shown, the variator 612 is connected to the rotary load 614 and to the battery 616 for electrical energy storage.

As shown, the variator 612 can be connected to either the main pump 602, DCV 604, or the linear mechanical load 608. Further, the variator 612 can be disconnected from the main pump 602, DCV 604, and linear mechanical load 608 via the mode valve 610 upstream of the variator 612.

There are thirteen modes of operation of the system 600 where power is exchanged between the components. These represent the cases where each component either supplies power, consumes power, or neither. For instance, power can be exchanged between three power sources/sinks (the variator motor/generator, the variator hydraulic pump/motor, and the rotary load). In some examples, there are another fourteen transient modes of operation in which power is input into the system 600 with no output, or output with no input. In some examples, in addition to the twenty-seven modes of operation, there are two possible sub-modes for each mode any time there is hydraulic input or output depending on the position of the mode valve 610. Each of the thirteen modes of operation of the system 600 and the associated sub-modes will now be described herein.

The system 600 is configured so that the user can manually interchange between modes and/or a control system 603 can automatically cycle between modes based on performance of the system 600. In some examples, a control system 603, substantially similar to the control system 513 described above, is in communication with the components of the system 600 to alter the behavior of the components and to, in some examples, interchange between modes and sub-modes of the system 600. In some examples, the control system 603 includes a plurality of sensors to monitor the behavior of components of the system 600. For example, the control system 603 can include at least one sensor in communication with the main pump 602 to monitor the performance of the main pump 602. In other examples, the control system 603 includes at least one sensor in communication with the variator 612. In some examples, the control system 603 is in communication with the variator 612 so as to alter the behavior of the variator 612 based on a particular mode selection. In some examples, substantially similar to the control system 513 described above, the control system 603 is in direct communication with a variator clutch to cycle the position of the clutch between first, second, and third positions to alter the behavior of the variator 612. In other examples, the control system 603 is in communication with the main pump 602. In other examples still, the control system 603 is in communication with the DCV 604 and/or the mode valve 610. In some examples, the control system 603 is an existing control system installed on a vehicle in which the system 600 is installed. In other examples, the control system is a stand-alone system separate from the vehicle control system.

Figure 7:
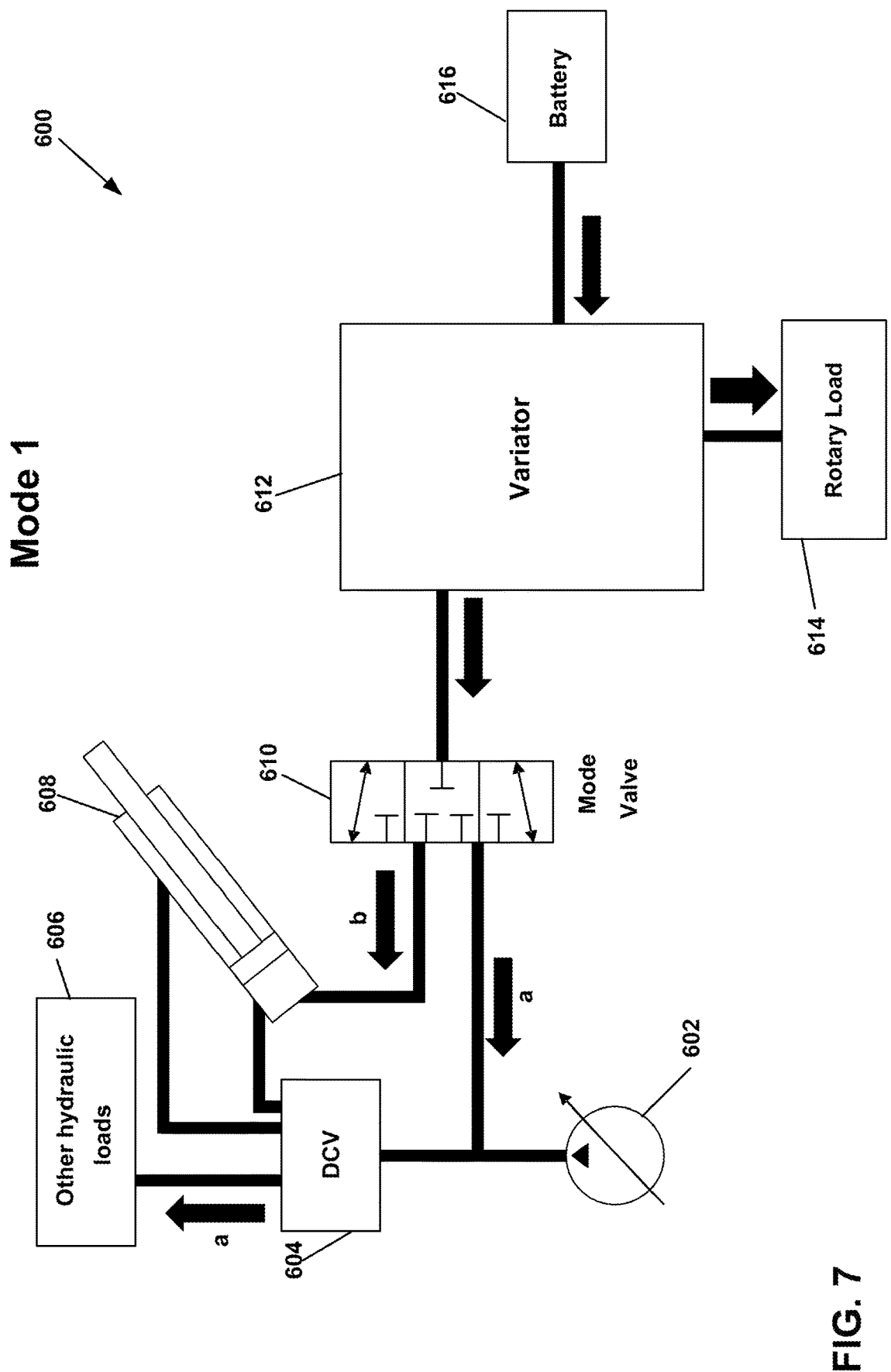
FIGS. 7-19 illustrate a plurality of operating modes of the energy recovery system of FIG. 6.

FIG. 7 depicts mode 1 of the system 600. Electric power is supplied by the battery 616 to drive the variator 612. The electric power is split by the variator 612 with a portion used to provide hydraulic power and a portion used to provide shaft power to the rotary load 614. The mode valve 610 is selectively movable between a first sub-mode, represented by arrow (a), and a second sub-mode, represented by arrow (b). As shown via arrow (a), the variator 612 simultaneously drives the rotary load 614 and supplies fluid flow to DCV 604. As shown via arrow (b), the variator 612 simultaneously drives the rotary load 614 and the linear mechanical load 608. In case (b), if insufficient hydraulic flow is provided by the variator 612 to the linear mechanical load 608, the additional flow can be provided by the main pump 602 via the DCV 604.

Figure 8:
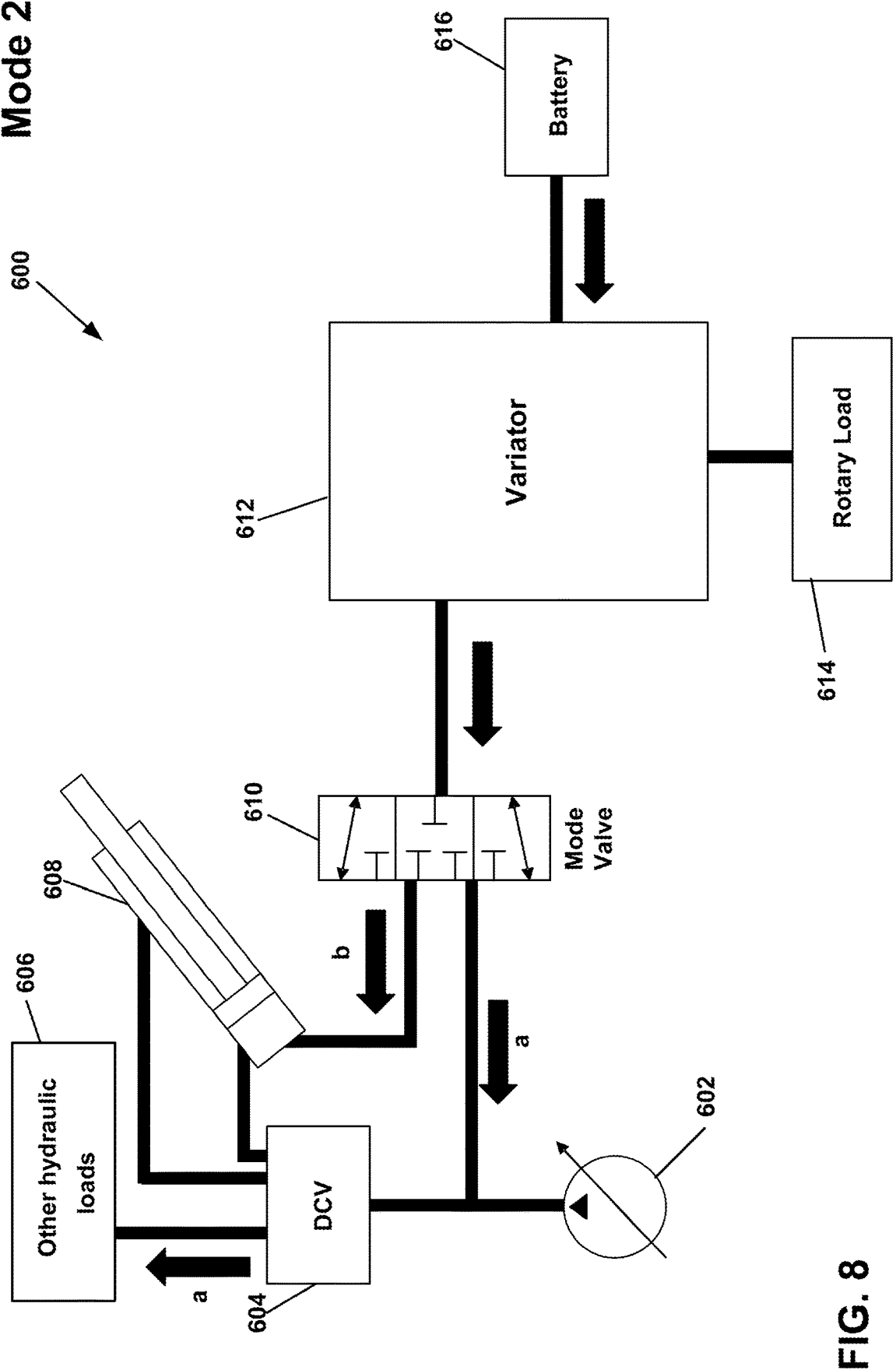

FIG. 8 depicts mode 2 of the system 600. Electric power is supplied by the battery 616 to drive the variator 612. The rotary load 614 is fixed so as to not rotate, causing all power to be exchanged between the battery 616 and the variator 612. The mode valve 610 is selectively movable between a first sub-mode, represented by arrow (a), and a second sub-mode, represented by arrow (b). Electric power is used to provide hydraulic power via arrow (a) to the DCV 604 to supply the general hydraulic loads 606. Power can also be supplied via arrow (b) to the linear mechanical load 608. In case (b), if insufficient hydraulic flow is provided by the variator 612 to the linear mechanical load 608, the additional flow can be provided by the main pump 602 via the DCV 604.

Figure 9:
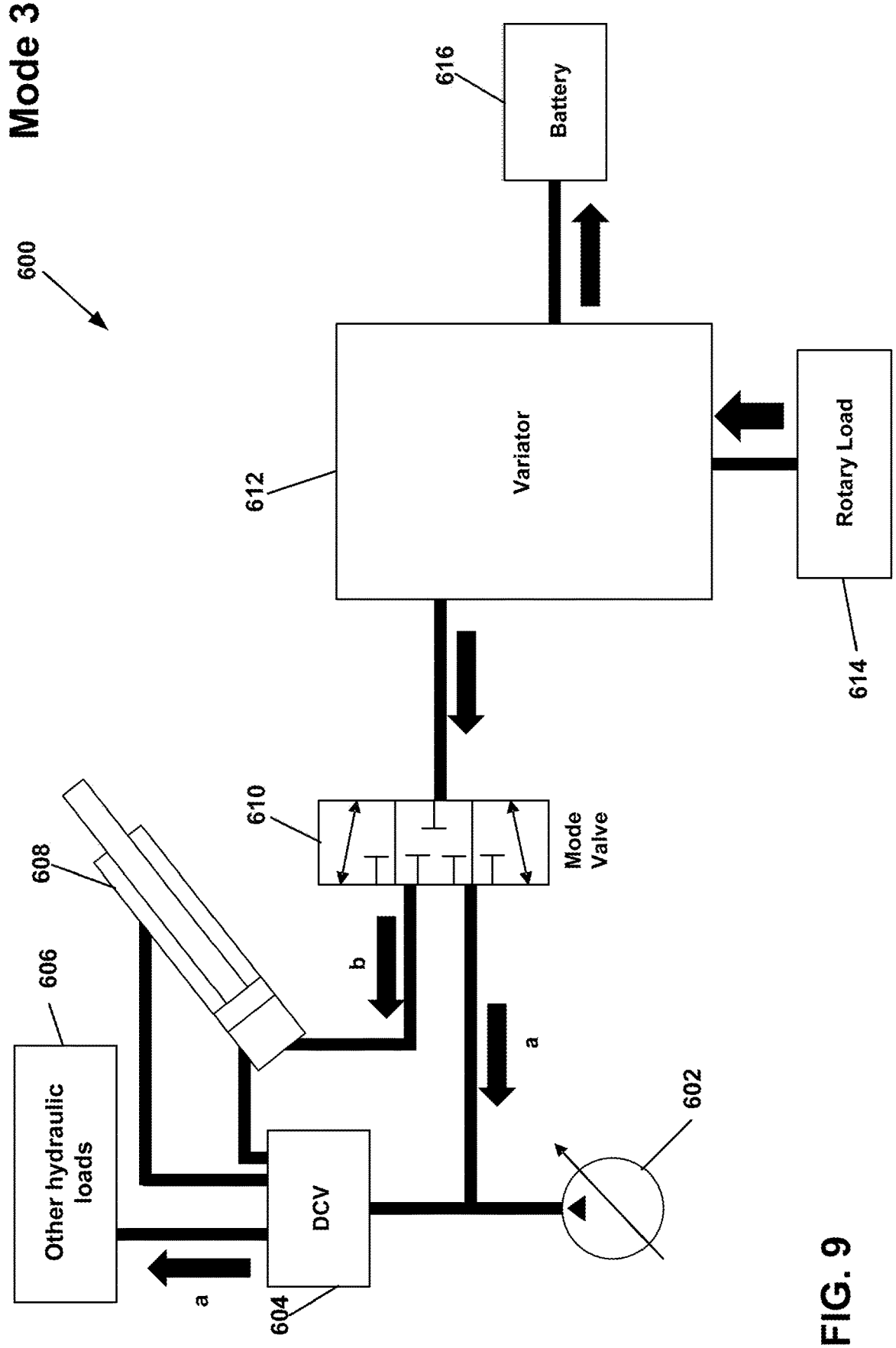

FIG. 9 depicts mode 3 of the system 600. Overrunning rotational power from the rotary load 614 is supplied to the variator 612. The variator 612 splits the power, with some being recovered electrically and provided to the battery 616, and the rest being pumped to the hydraulic circuit 601. The mode valve 610 provides power via arrow (a) to the DCV 604 to supply the general hydraulic loads 606, or power is supplied via arrow (b) to the linear mechanical load 608. In case (b), if insufficient hydraulic flow is provided by the variator 612 to the linear mechanical load 608, the additional flow can be provided by the main pump 602 via the DCV 604.

Figure 10:
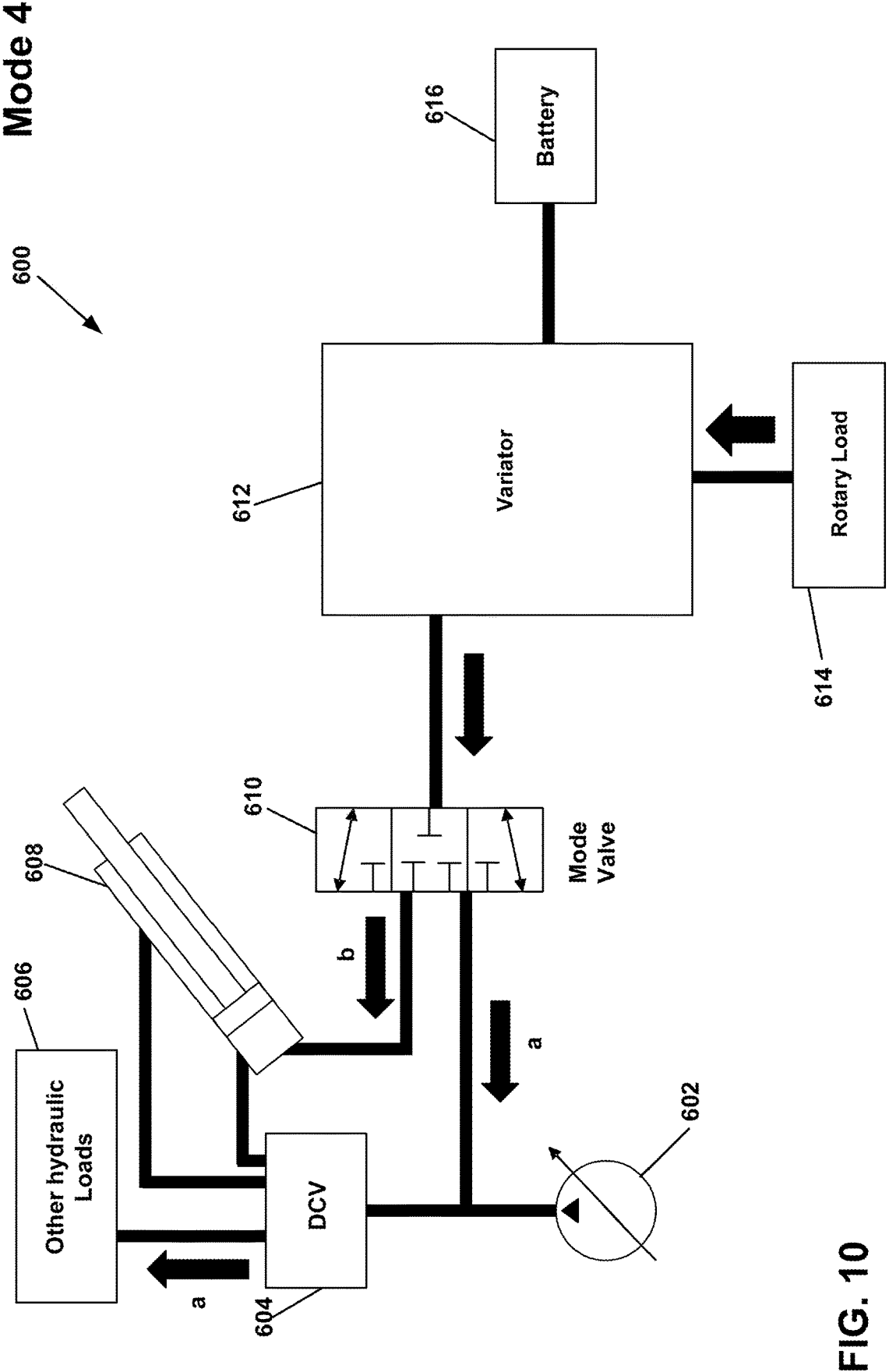

FIG. 10 depicts mode 4 of the system 600. Overrunning rotational power from the rotary load 614 is supplied to the variator 612. The variator 612 supplies all power to the hydraulic circuit 601. The mode valve 610 provides power via arrow (a) to the DCV 604 to supply the general hydraulic loads 606, or power is supplied via arrow (b) to the linear mechanical load 608. In case (b), if insufficient hydraulic flow is provided by the variator 612 to supply the linear mechanical load 608, the additional flow can be provided by the main pump 602 via the DCV 604. In some embodiments, the variator 612 includes a clutch that connects a motor-generator to one of three nodes of an epicyclic gear set. When in mode 4, the clutch is shifted to connect the node that is affixed to a fixed surface to prevent motion without requiring the motor-generator to provide reaction torque.

Figure 11:
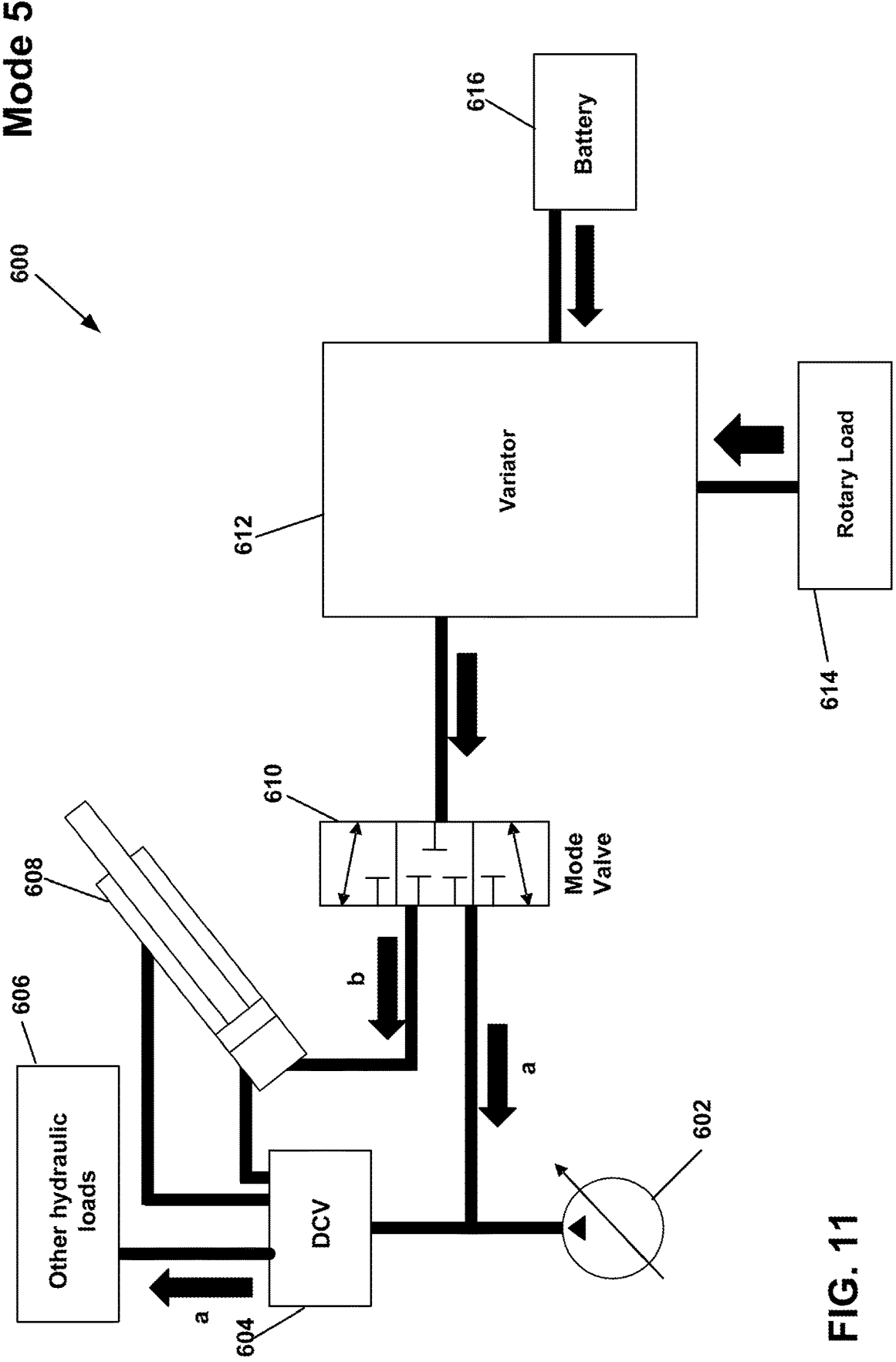

FIG. 11 depicts mode 5 of the system 600. Both overrunning rotational power from the rotary load 614 and electric power from the battery 616 are supplied to power variator 612. The mode valve 610 provides power via arrow (a) to the DCV 604 to supply the general hydraulic loads 606, or power is supplied via arrow (b) to the linear mechanical load 608. In case (b), if insufficient hydraulic flow is provided by the variator 612 to the linear mechanical load 608, the additional flow can be provided by the main pump 602 via the DCV 604.

Figure 12:
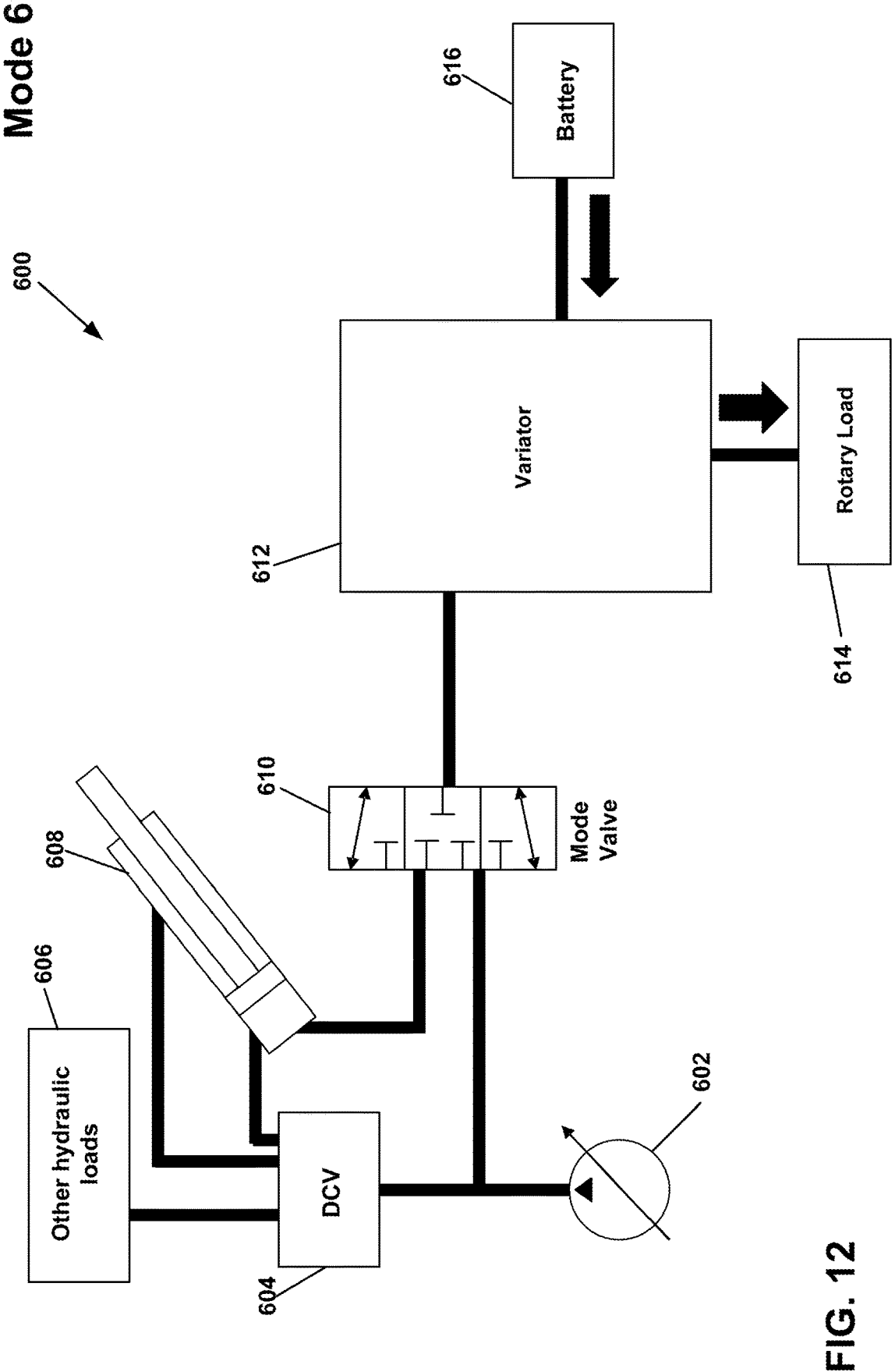

FIG. 12 depicts mode 6 of the system 600. Electric power is supplied by the battery 616 to drive the variator 612. The mode valve 610 is centered so all power provided to the variator 612 is supplied to the rotary load 614. In some embodiments, the variator 612 includes a pump and, when in mode 6, the displacement of the pump is reduced to zero.

Figure 13:
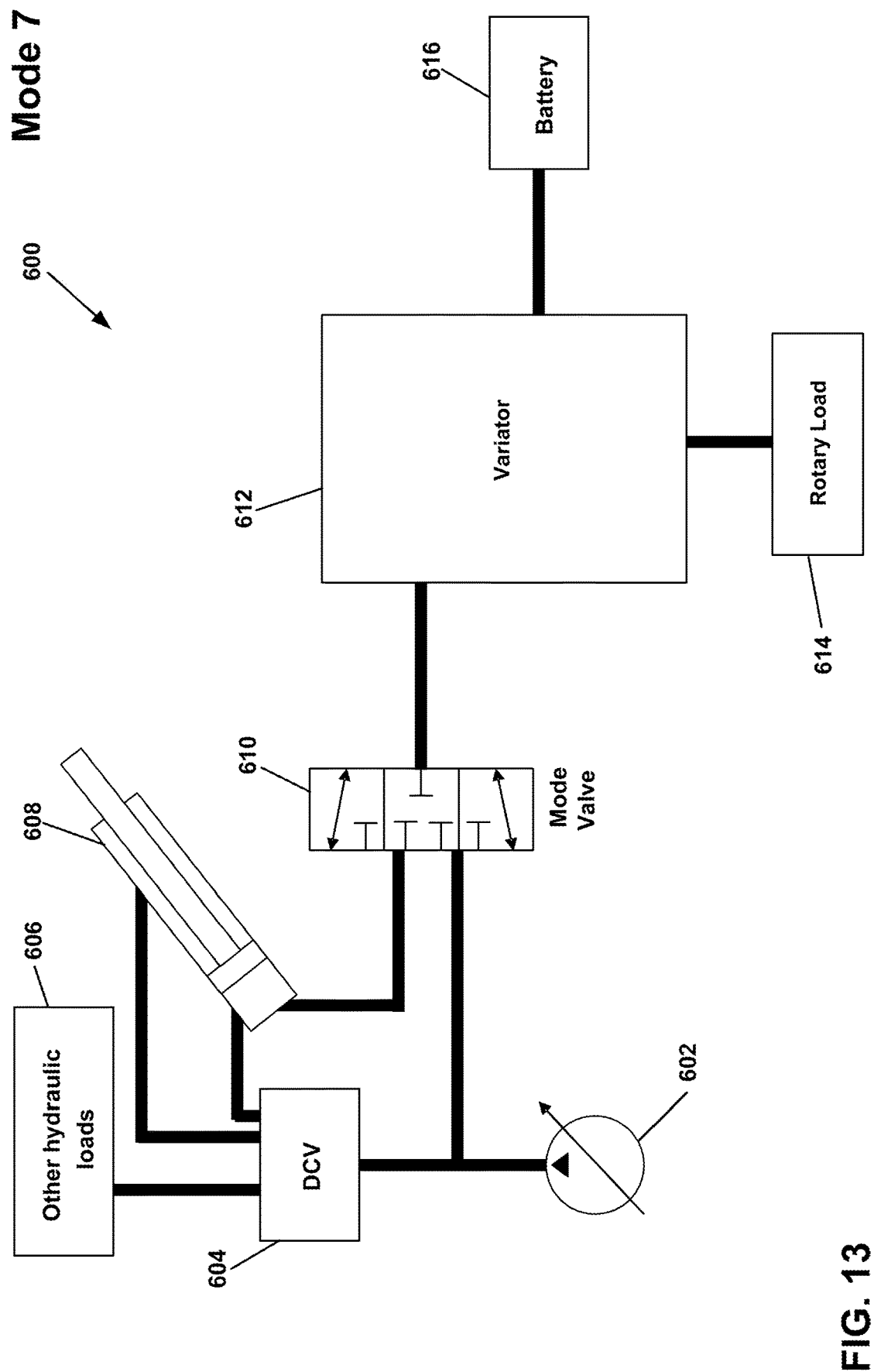

FIG. 13 depicts mode 7 of the system 600. The rotary load 614 is fixed so as to not rotate, and no power is supplied by the battery 616. The mode valve 610 is centered, and, therefore, with no power supplied to the variator 612, the variator 612 and associated system 600 are stationary. In some embodiments, the variator 612 includes a pump and, when in mode 7, the displacement of the pump is reduced to zero.

Figure 14:
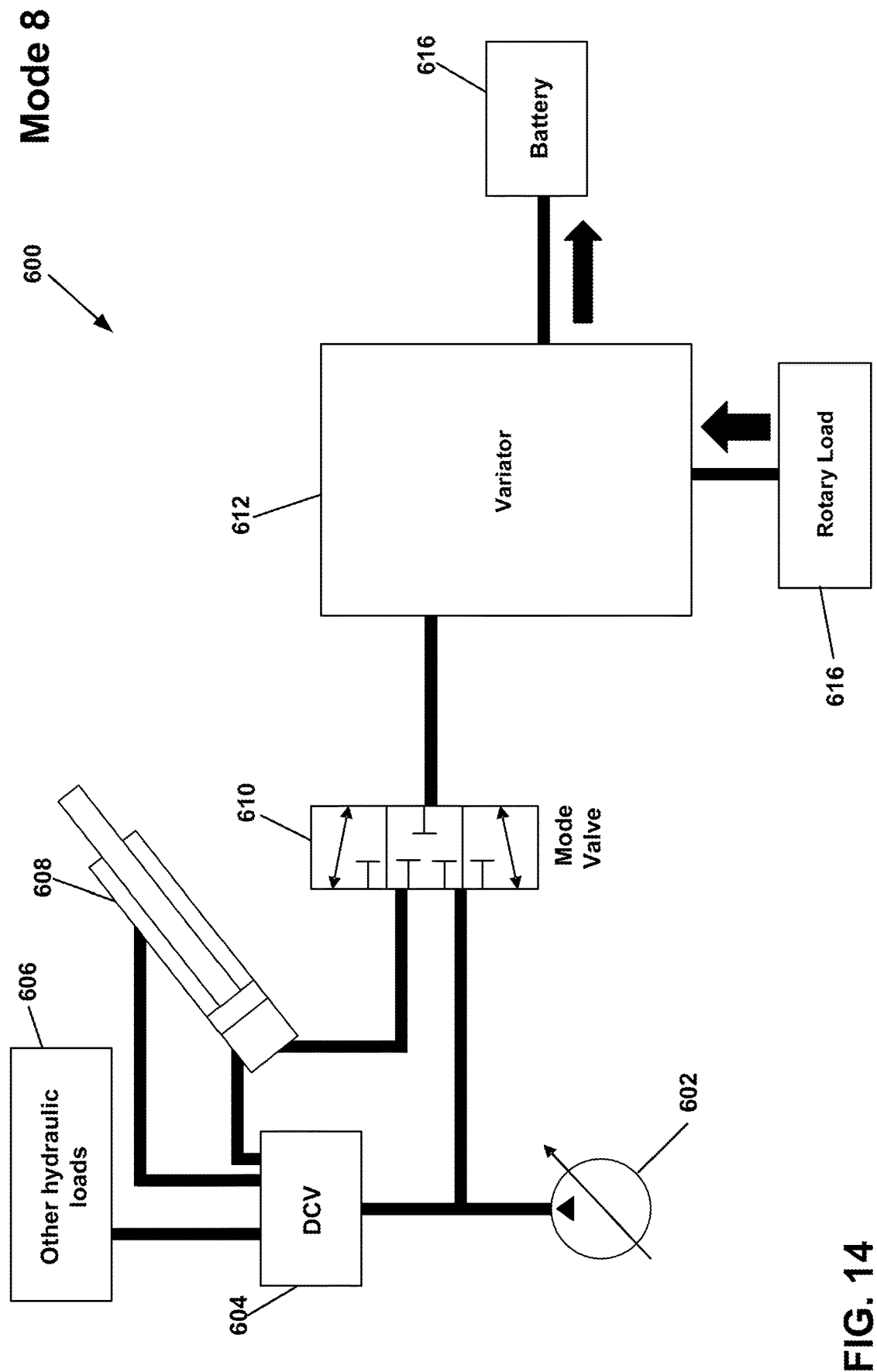

FIG. 14 depicts mode 8 of the system 600. Overrunning rotational power from the rotary load 614 is supplied to the variator 612. The variator 612 outputs all power via electricity which is stored in the battery 616. The mode valve 610 is centered so all power provided to the variator 612 is supplied to the battery 616 via electricity. In some embodiments, the variator 612 includes a pump and, when in mode 8, the displacement of the pump is reduced to zero.

Figure 15:
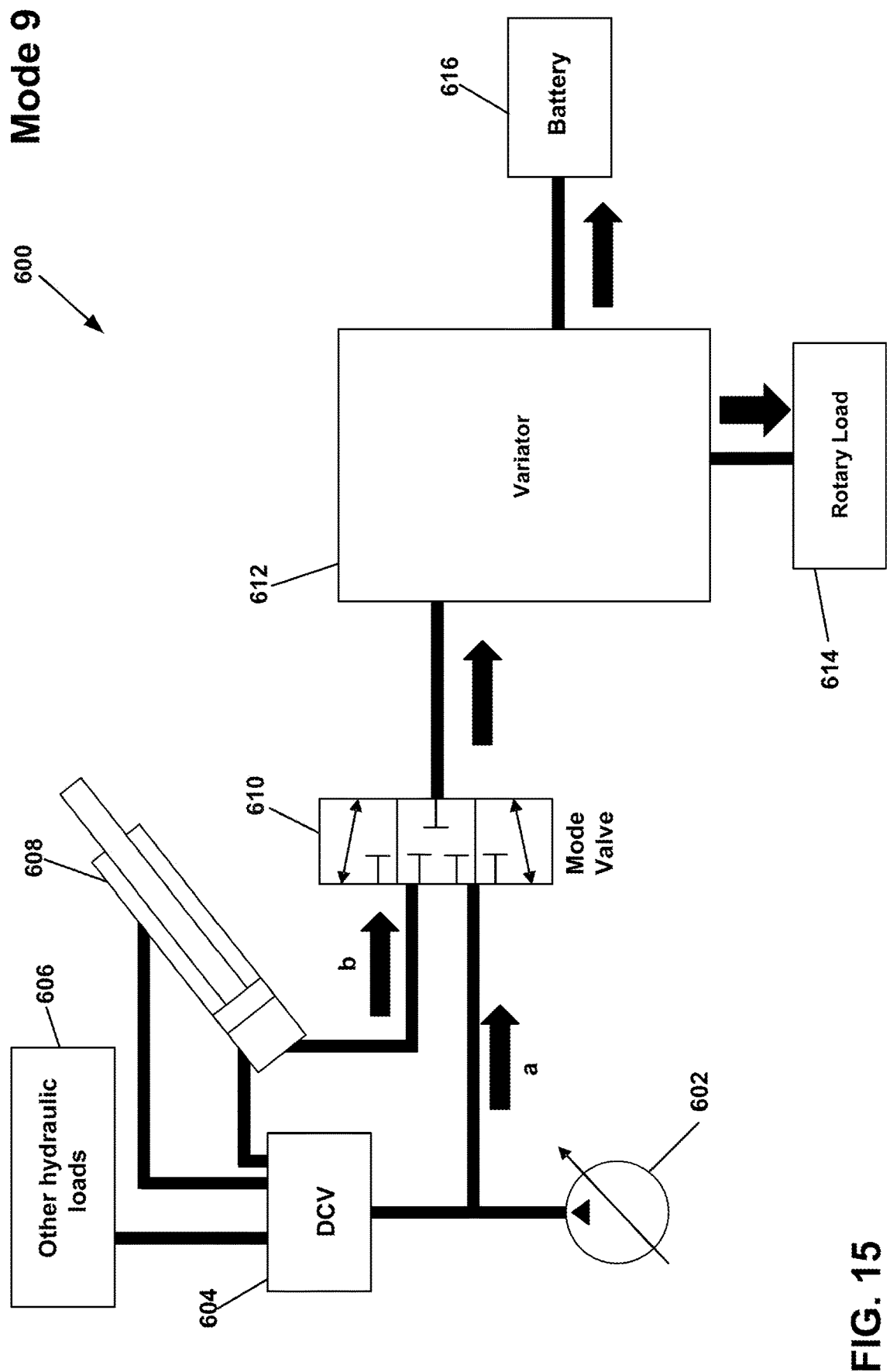

FIG. 15 depicts mode 9 of the system 600. The mode valve 610 is selectively movable between a first sub-mode, represented by arrow (a), and a second sub-mode, represented by arrow (b). Power is supplied to the variator 612 via arrow (a) from the main pump 602 or via arrow (b) by way of overrunning power from the linear mechanical load 608. Such power is split at the variator 612 with a portion being used to drive the rotary load 614 and a portion used to supply electricity to the battery 616.

Figure 16:
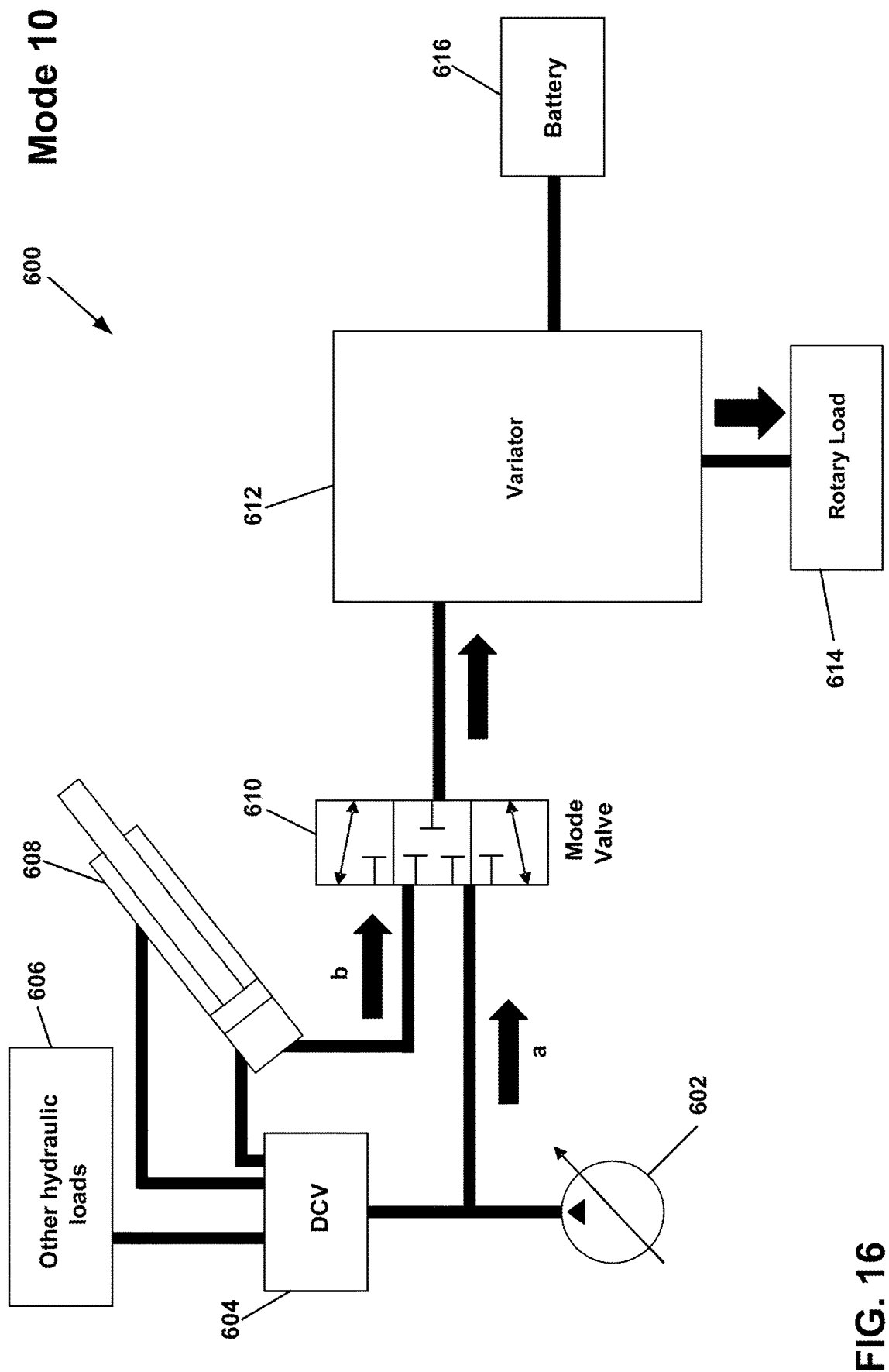

FIG. 16 depicts mode 10 of the system 600. The mode valve 610 is selectively movable to provide hydraulic power to the variator 612 via arrow (a) from main pump 602 or via arrow (b) by way of overrunning power from the linear mechanical load 608. All power provided to the variator 612 is supplied to the rotary load 614. In some embodiments, the variator 612 includes a clutch connecting a motor-generator to one of three nodes of an epicyclic gear set. When in mode 10, the clutch is shifted to connect the node that is affixed to a fixed surface to prevent motion without requiring the motor-generator to provide reaction torque.

Figure 17:
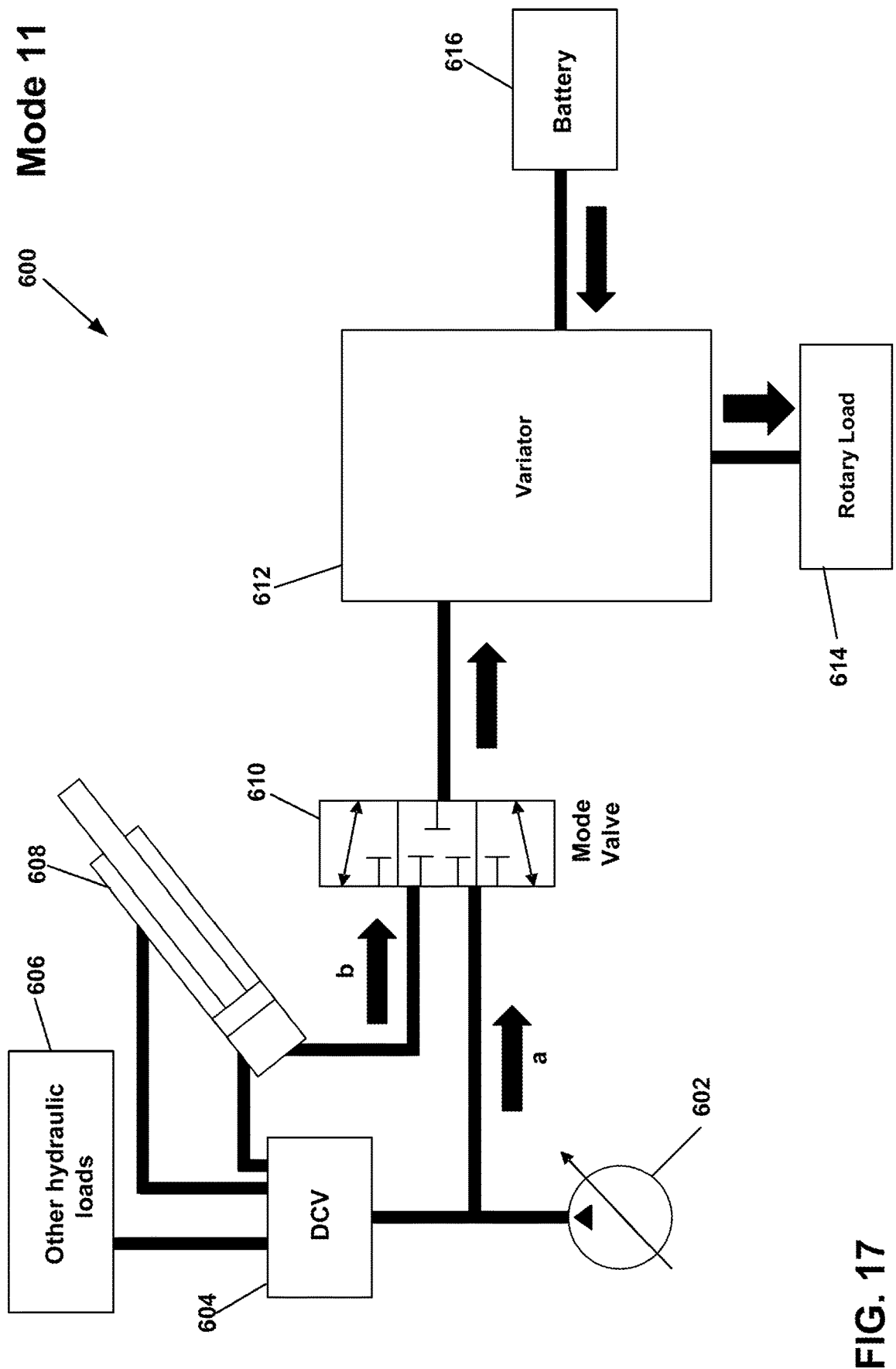

FIG. 17 depicts mode 11 of the system 600. The mode valve 610 is selectively movable to provide hydraulic power to the variator 612 via arrow (a) from main pump 602 or via arrow (b) by way of overrunning power from the linear mechanical load 608. Power is also supplied to the variator 612 via the battery 616. All power provided to the variator 612 is supplied to the rotary load 614.

Figure 18:
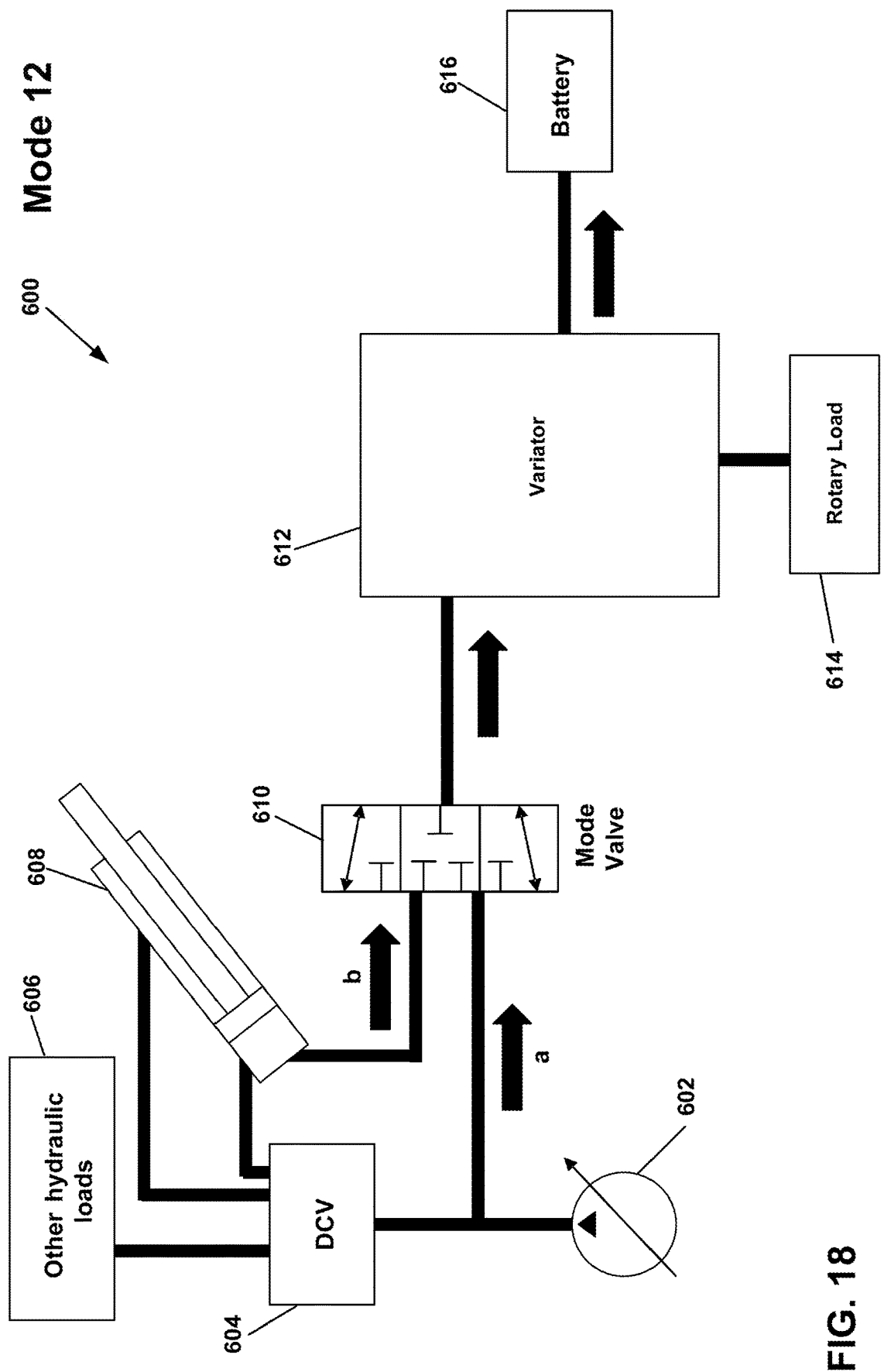

FIG. 18 depicts mode 12 of the system 600. The mode valve 610 is selectively movable to provide hydraulic power to the variator 612 via arrow (a) from main pump 602 or via arrow (b) by way of overrunning power from the linear mechanical load 608. The rotary load 614 is fixed so as to not rotate. All power provided to the variator 612 is output to the battery 616 via electricity.

Figure 19:
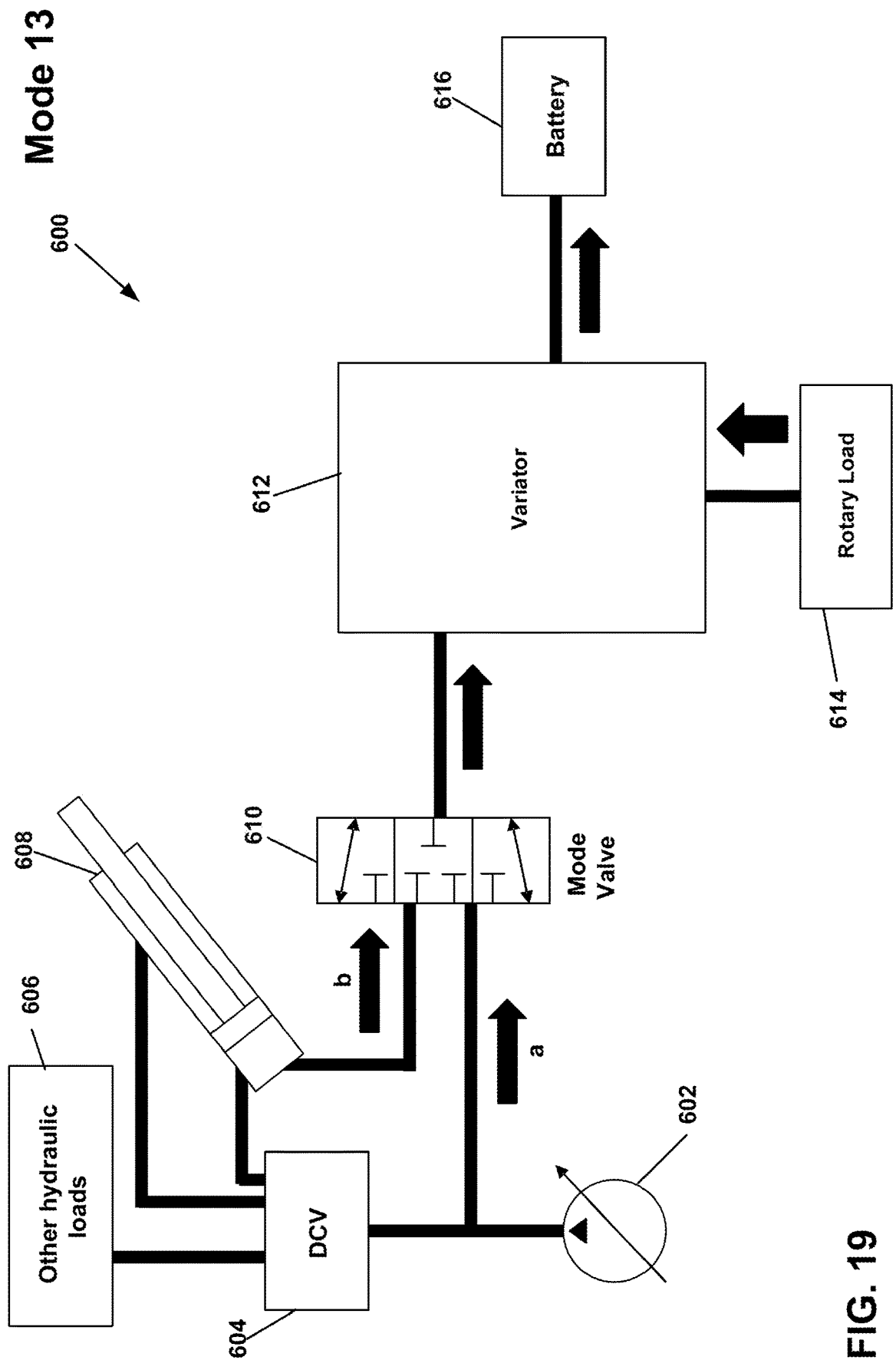

FIG. 19 depicts mode 13 of the system 600. The mode valve 610 is selectively movable to provide hydraulic power to the variator 612 via arrow (a) from main pump 602 or via arrow (b) by way of overrunning power from the linear mechanical load 608. Power is also supplied to the variator 612 via the rotary load 614. All power provided to the variator 612 is output to the battery 616 via electricity.

Figure 20:
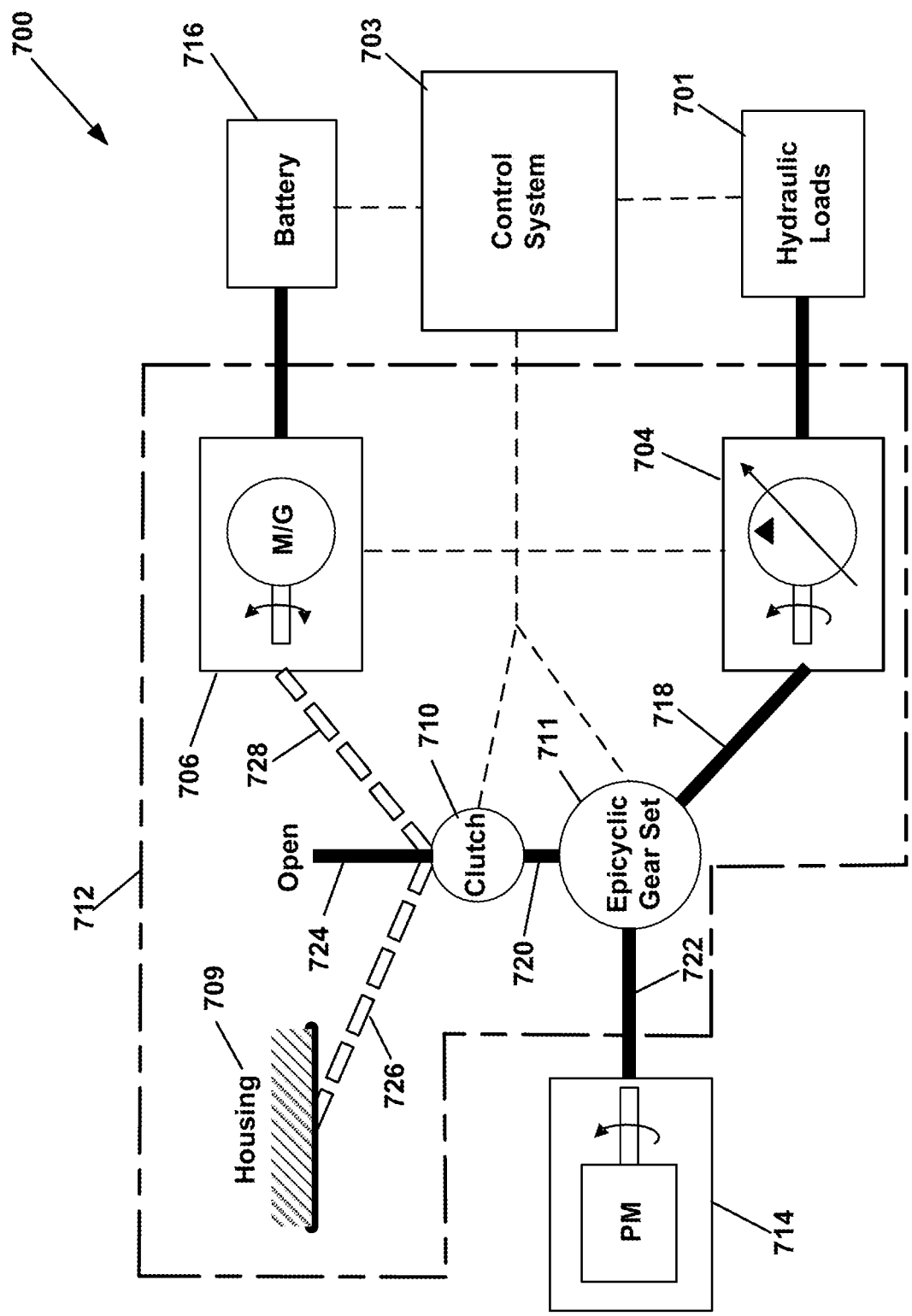
FIG. 20 illustrates a schematic application of an energy recovery system having a pump/motor with an integrated variator, according to one embodiment of the present disclosure.

FIG. 20 shows a schematic of an energy recovery system 700 according to one embodiment of the present disclosure. In some examples, the system 700 is similar to the systems 500, 600 disclosed above. The system 700 includes a hydraulic circuit 701 that can include a plurality of different hydraulic components, such as general hydraulic system loads, linear loads, and rotational mechanical loads. The system also includes a variator 712, a prime mover 714, and a battery 716.

In some embodiments, the variator 712 includes a variable or fixed displacement pump 704, a motor-generator 706, a clutch 710, and an epicyclic gear set 711, similar to those described with respect to the systems 500, 600 above. In the depicted embodiment, the variator 712's motor-generator 706 is an electric motor. In some embodiments, the variator 712 is contained within a single housing 709. In other embodiments, the variator 712 comprises a plurality of individually housed components. As shown, the variator 712 is connected to the prime mover 714, the battery 716 for electrical energy storage, and the hydraulic circuit 701.

As shown, the individual components of the variator 712 are interconnected by the epicyclic gear set 711. The epicyclic gear set 711 includes at least three nodes: a first node 718, a second node 720, and a third node 722. Components can be connected to the various nodes 718, 720, 722 of the epicyclic gear set 711 in a variety of different ways to achieve different gear ratios. In the example shown, the variator pump 704 is connected to the first node 718, the clutch 710 is connected to the second node 720, and the prime mover 714 can be connected to the third node 722.

In the depicted embodiment, the variator 712 includes the clutch 710, similar to the clutch 510 described above, having a first position 724, a second position 726, and a third position 728. In the first position 724, the clutch 710 allows the second node 720 to be open, or freewheel. When in the second position 726, the clutch 710 connects the second node 720 to a fixed surface, such as the housing 709. When in the third position 728, the clutch 710 connects the second node 720 to the motor-generator 706. In some embodiments, a second clutch is used in conjunction with clutch 710.

The variator 712 can provide a load leveling function that permits the prime mover 714 to be run at a consistent operating condition (i.e., a steady operating condition), thereby assisting in enhancing an overall efficiency of the prime mover 714. The load leveling function can be provided by efficiently storing energy in the battery 716 during periods of low loading on the prime mover 714, and efficiently releasing the stored energy and powering the variator 712 during periods of high loading of the prime mover 714. This allows the prime mover 714 to be sized for an average power requirement rather than a peak power requirement. The prime mover 714 can be a diesel engine, a spark ignition engine, an electric motor, or other power source.

Like the system 600, in some examples there are thirteen modes of operation of the system 700 when the variator 712 is connected directly to the prime mover 714 and power is exchanged between the components. These represent the cases where each component either supplies power, consumes power, or neither. For instance, power can be exchanged between three power sources/sinks (the variator motor/generator 706, the variator hydraulic pump/motor 704, and the prime mover 714). In some examples, there are another fourteen transient modes of operation in which power is input into the system 700 with no output, or output with no input. Each of the thirteen modes of operation of the system 700 and the associated sub-modes will now be described herein.

Like systems 500, 600, system 700 is configured so that the user can manually interchange between modes and/or a control system 703 can automatically cycle between modes based on performance of the system 700. In some examples, a control system 703, substantially similar to control systems 603 and 513, is in communication with the components of the system 700 to alter the behavior of the components and to, in some examples, interchange between modes of the system 700.

In some examples, the control system 703 is in communication with the variator 712. Specifically, the control system 703 is in communication with the epicyclic gear set 711, clutch 710, variator pump 704, and/or motor-generator 706 to monitor (e.g., with sensors) and/or control the performance thereof In some examples, the control system 703 is in direct communication with the clutch 710 to cycle the position of the clutch 710 between the first, second, and third positions. In some examples, the control system 703 is also in communication with the hydraulic circuit 701, the prime mover 714, and/or the battery 716 to monitor and/or alter the performance thereof.

Figure 21:
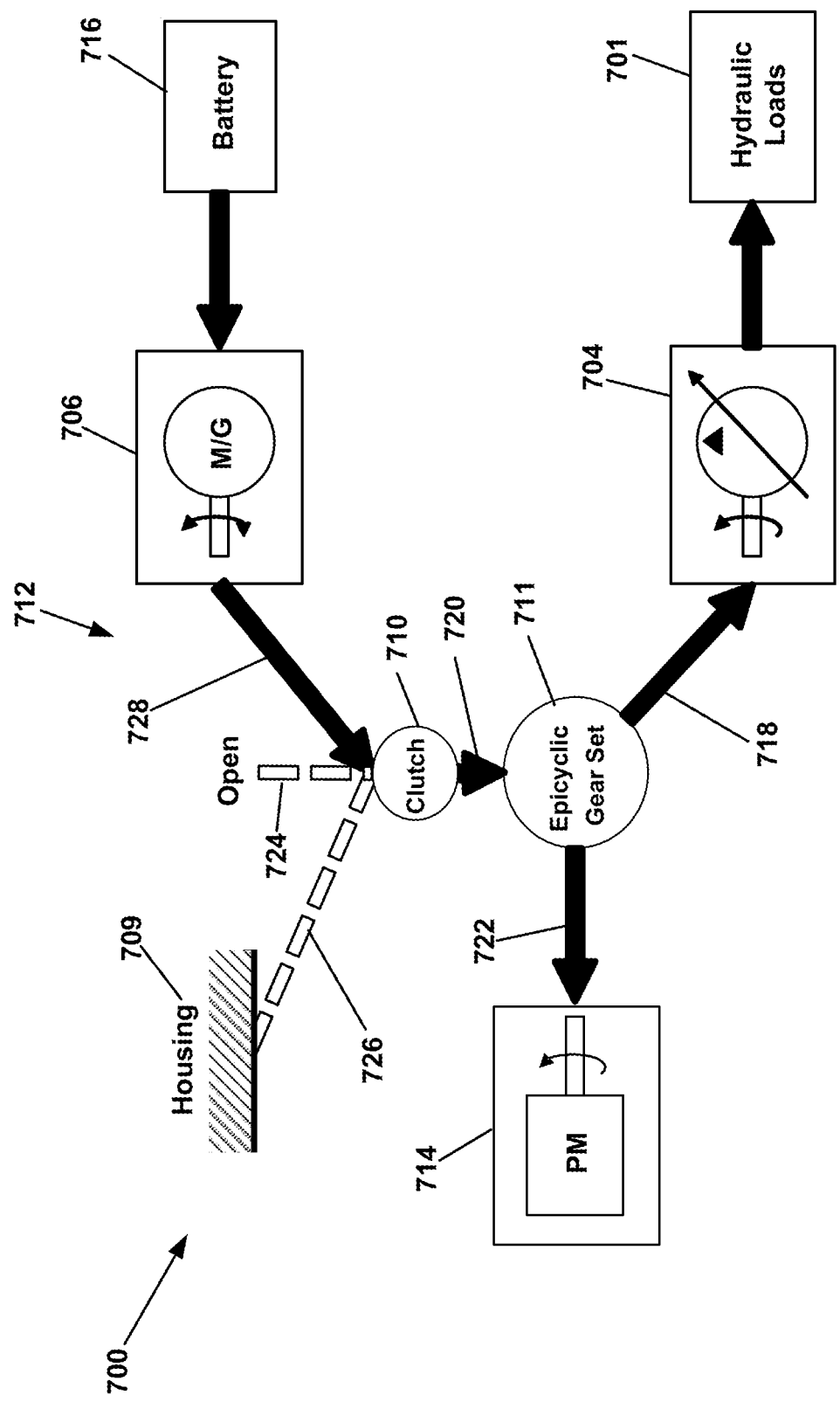
FIGS. 21-33 illustrate a plurality of operating modes of the energy recovery system of FIG. 20.

FIG. 21 depicts mode 1 of system 700. As shown, the system 700 is experiencing a high load period of load leveling, and the battery 716 is providing power to the motor-generator 706 of the variator 712 so that the variator 712 can provide power to both the hydraulic circuit 701 and the prime mover 714. The variator 712 is shown boosting the prime mover 714 to allow the prime mover 714 to continue to power other loads connected to the prime mover 714 during the high load period. As shown, the clutch 710 is in the third position 728, connecting the second node 720 of the epicyclic gear set 711 to the motor-generator 706.

Figure 22:
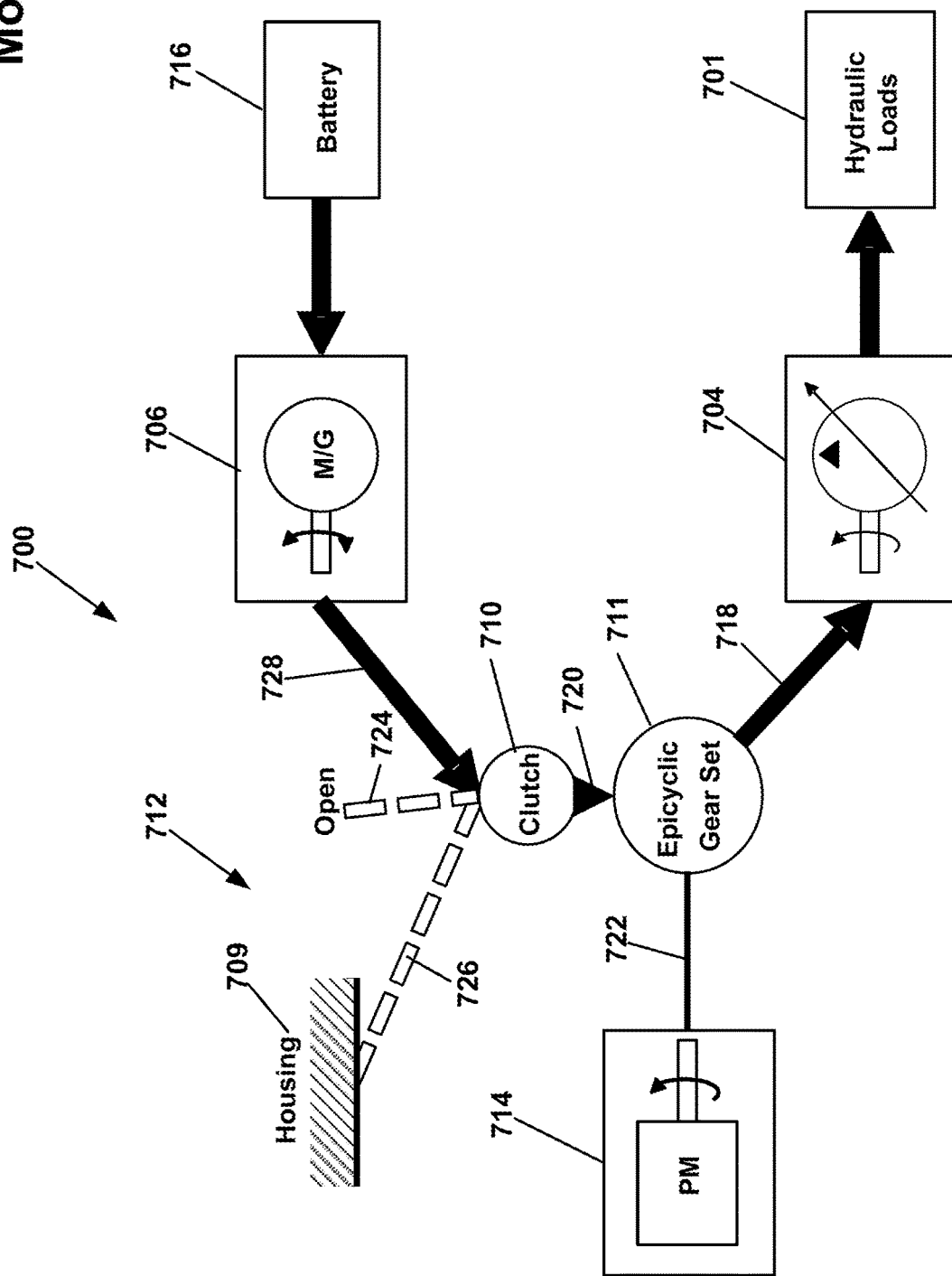

FIG. 22 depicts mode 2 of system 700. As shown, power is provided to the variator 712 by the battery 716, specifically to the motor-generator 706. The variator 712 is providing power to only the hydraulic circuit 701. As shown, the clutch 710 is in the third position 728, connecting the second node 720 of the epicyclic gear set 711 to the motor-generator 706.

Figure 23:
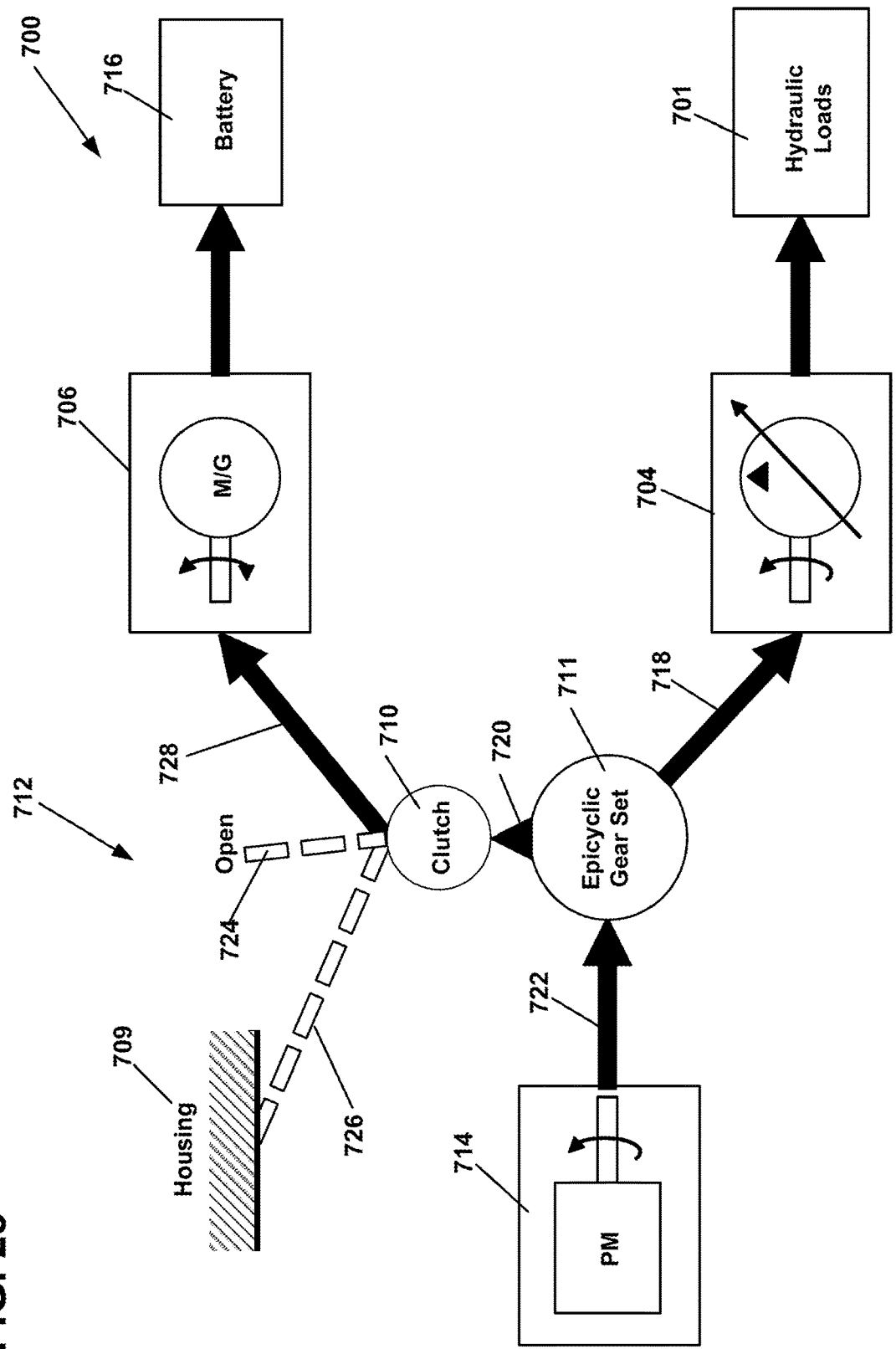

FIG. 23 depicts mode 3 of system 700. As shown, the system 700 is experiencing a low load period of load leveling. The prime mover 714 is providing power to the variator 712, and the variator 712 is outputting power to the hydraulic circuit 701 and providing electricity via the motor-generator 706 to store in the battery 716. As shown, the clutch 710 is in the third position 728, connecting the second node 720 of the epicyclic gear set 711 to the motor-generator 706.

Figure 24:
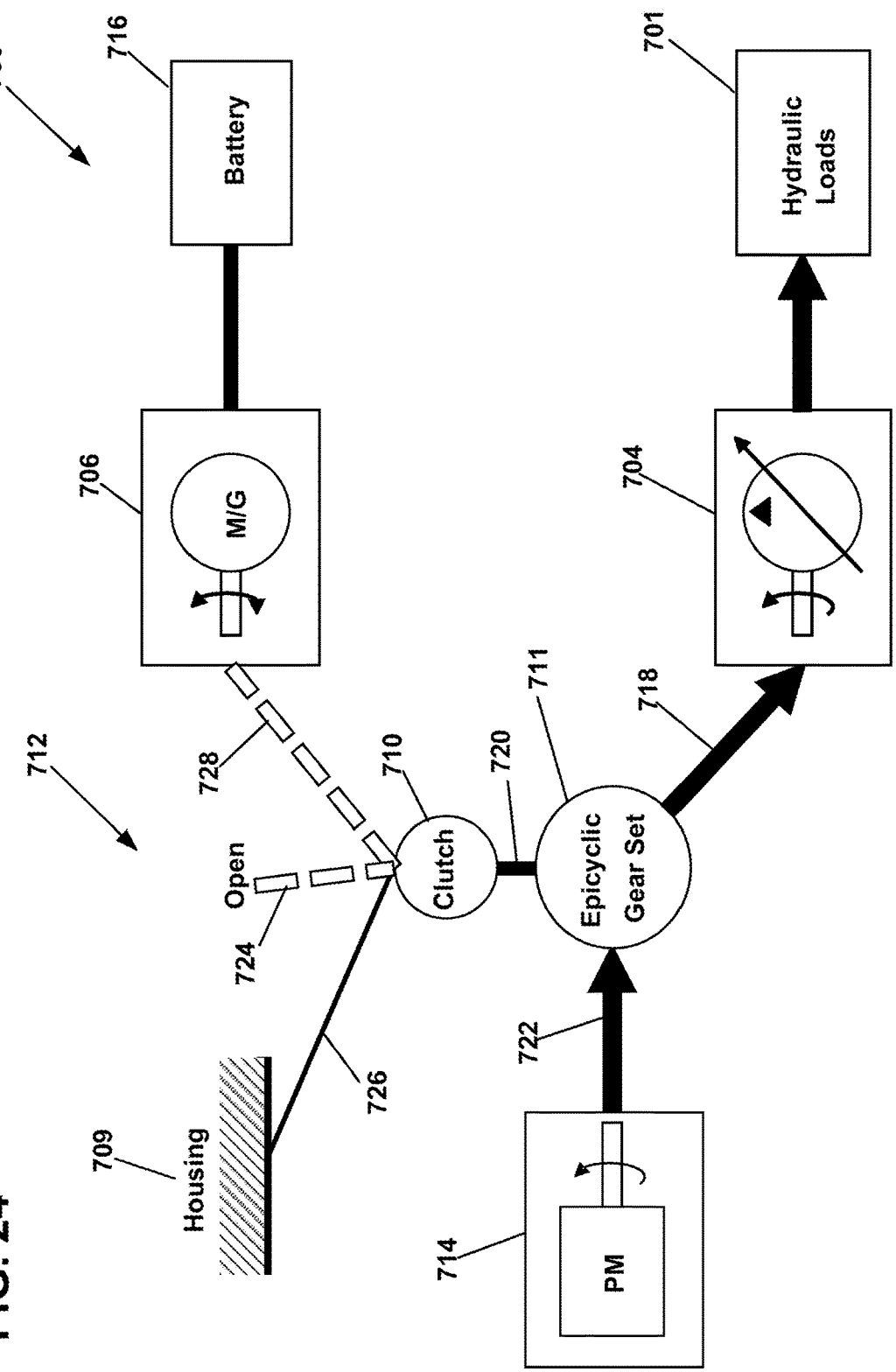

FIG. 24 depicts mode 4 of system 700. As shown, power is provided to the variator 712 by the prime mover 714. The variator 712 is providing power to only the hydraulic circuit 701. As shown, the clutch 710 is in the second position 726, connecting the second node 720 of the epicyclic gear set 711 to the housing 709, or a fixed surface. The system is operating at a fixed speed ratio between the pump 704 and the prime mover 714 due to the clutch 710 being connected to a fixed surface.

Figure 25:
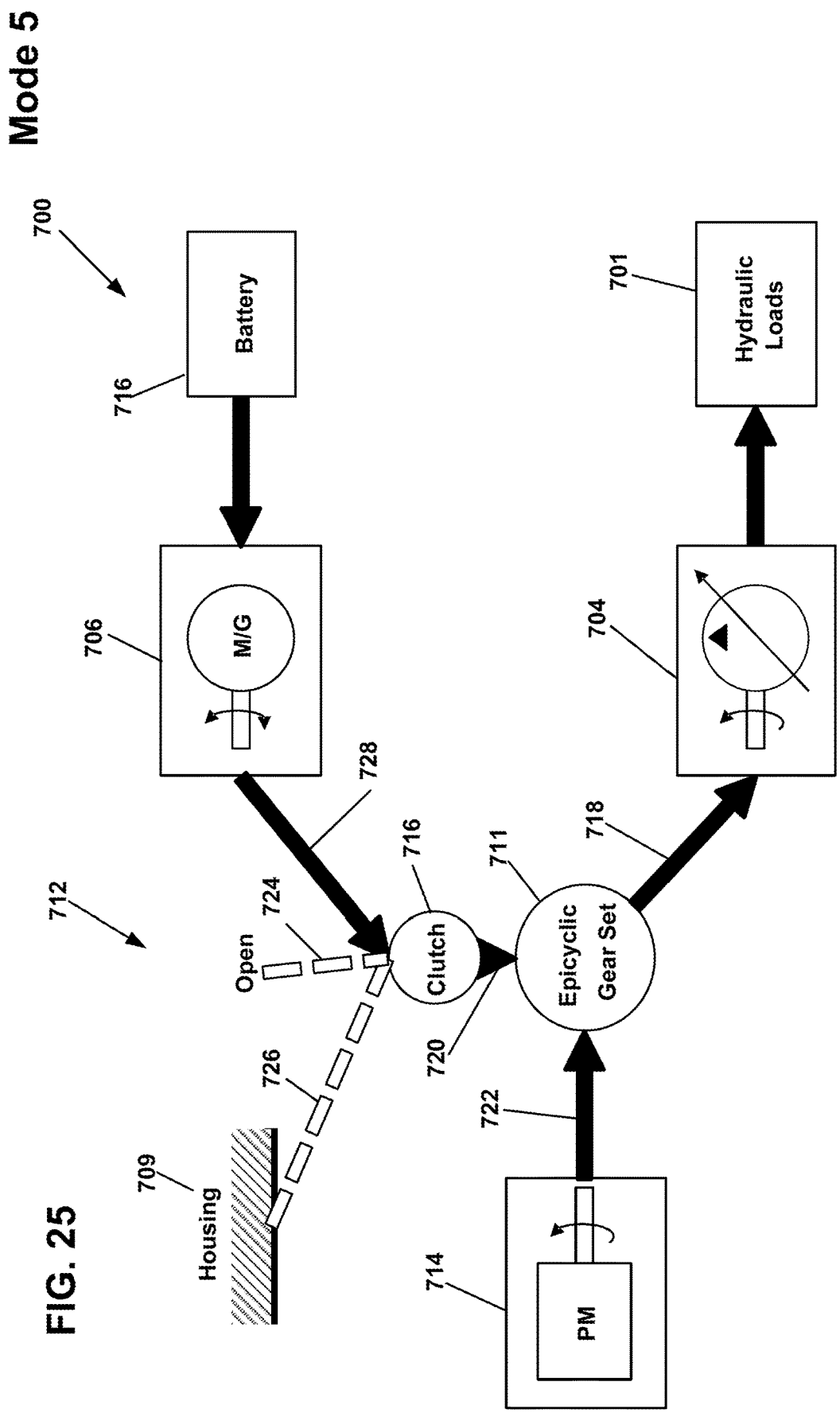

FIG. 25 depicts mode 5 of system 700. As shown, power is provided to the variator 712 by the prime mover 714 and the battery 716 via the motor-generator 706. The variator 712 is providing power to only the hydraulic circuit 701. In mode 5, the battery 716 reduces the apparent load on the prime mover 714, or provides a boost to the prime mover 714. As shown, the clutch 710 is in the third position 728, connecting the second node 720 of the epicyclic gear set 711 to the motor-generator 706.

Figure 26:
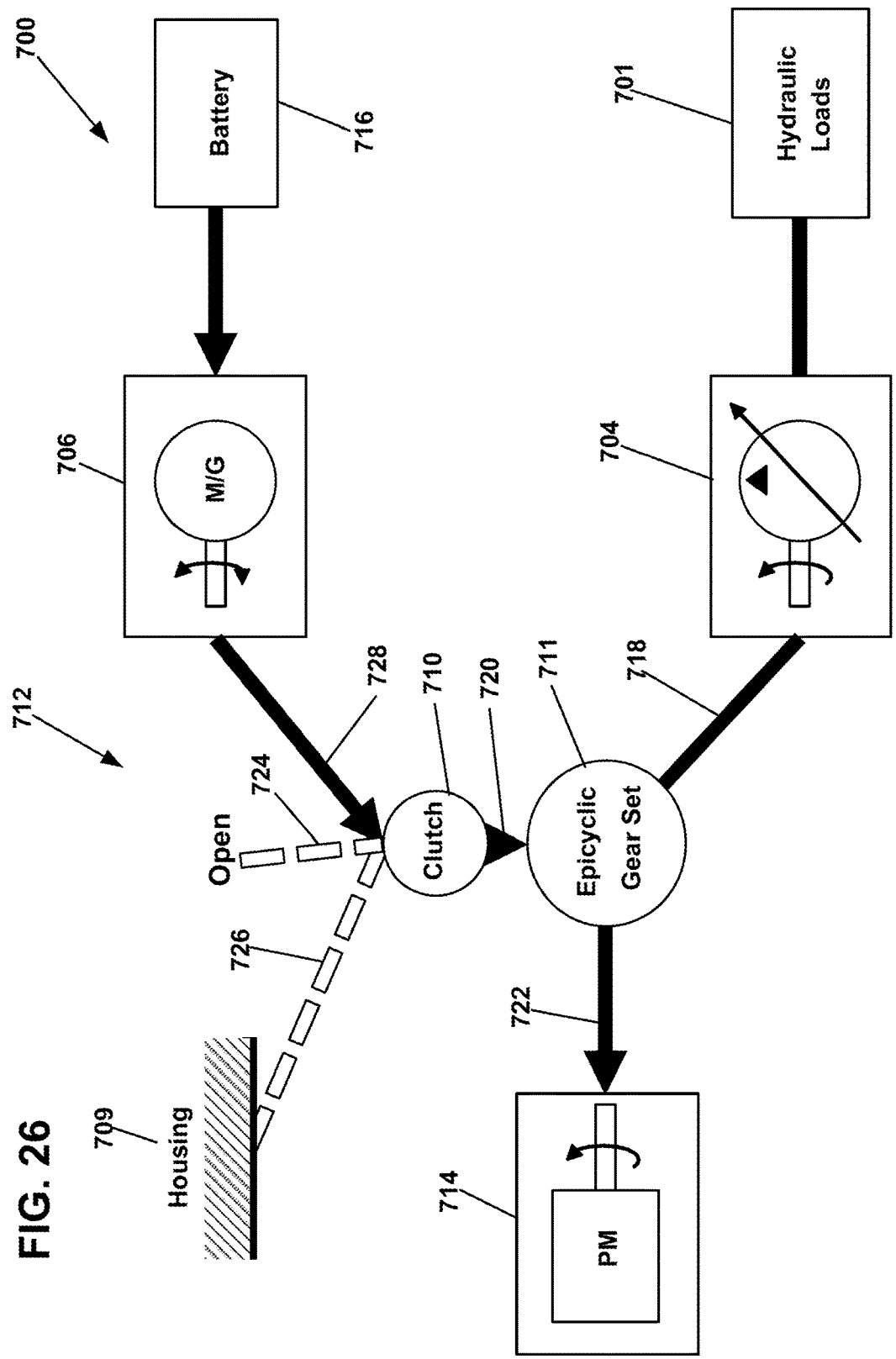

FIG. 26 depicts mode 6 of system 700. As shown, the system 700 is experiencing a high load period of load leveling, and the battery 716 is providing power to the motor-generator 706 of the variator 712 so that the variator 712 can provide power only to the prime mover 714. The variator 712 is shown boosting the prime mover 714 to allow the prime mover 714 to continue to power other loads connected to the prime mover 714 during the high load period. As shown, the clutch 710 is in the third position 728, connecting the second node 720 of the epicyclic gear set 711 to the motor-generator 706.

Figure 27:
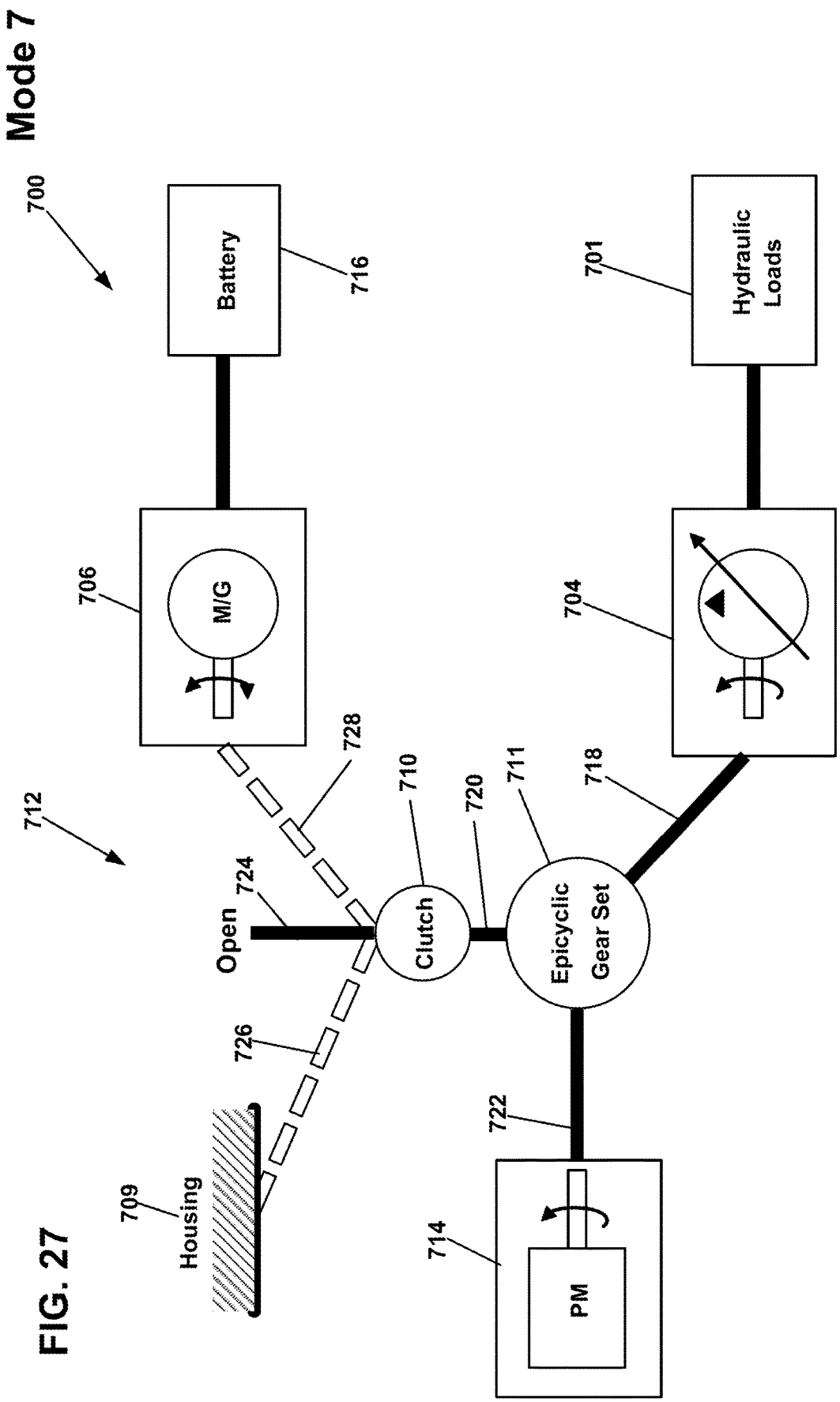

FIG. 27 depicts mode 7 of system 700. No power is being supplied to the system 700 and, therefore, the variator 712 is not outputting any power. As shown, the clutch 710 is in the first position 724, connecting the second node 720 of the epicyclic gear set 711 to an open position.

Figure 28:
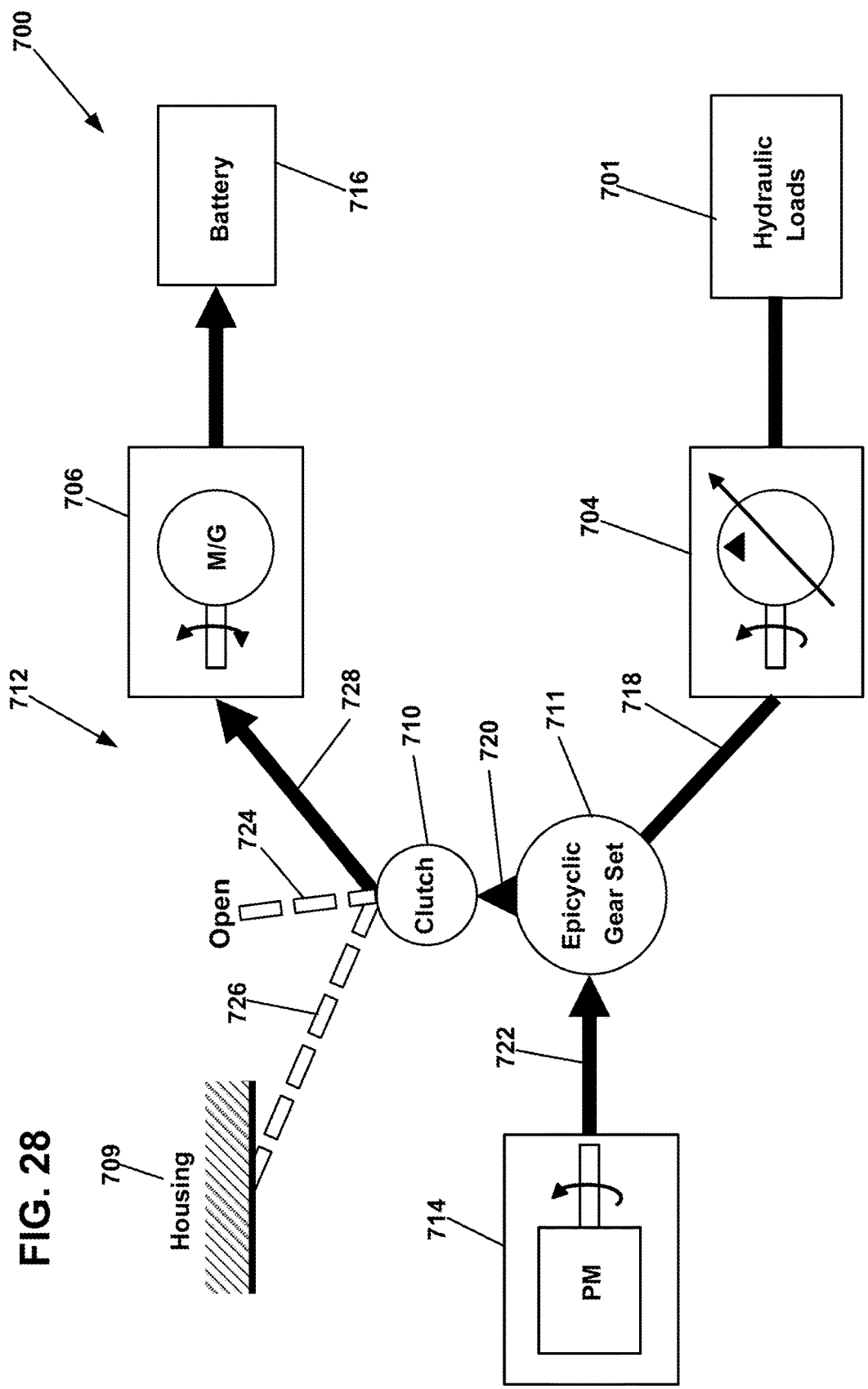

FIG. 28 depicts mode 8 of system 700. As shown, power is provided to the variator 712 by the prime mover 714. The variator 712 is providing power via the motor-generator 706 to only the battery 716. As shown, the clutch 710 is in the third position 728, connecting the second node 720 of the epicyclic gear set 711 to the motor-generator 706.

Figure 29:
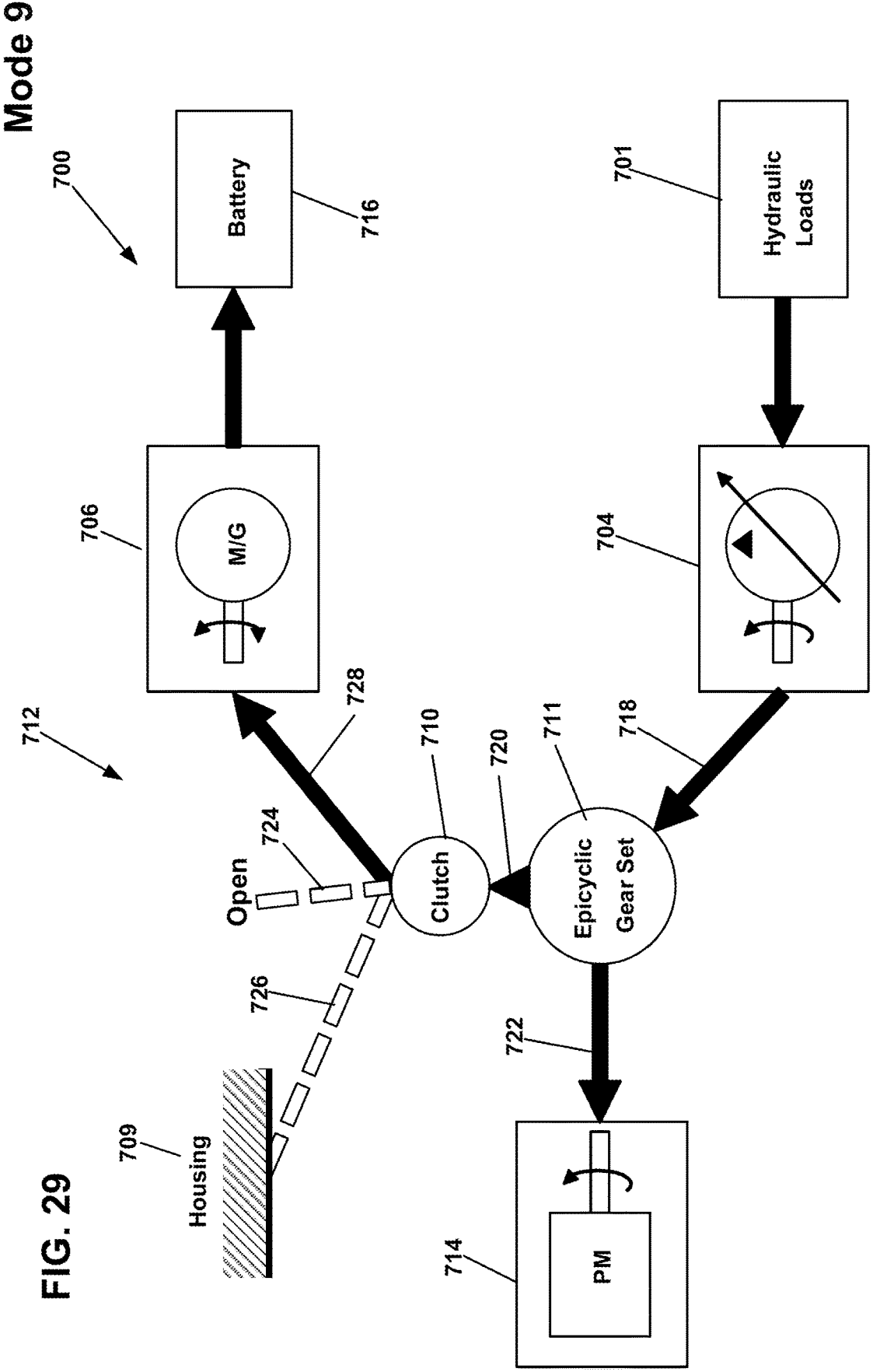

FIG. 29 depicts mode 9 of system 700. Power is provided to the variator 712, via the pump 704, by overrunning power existing in the hydraulic circuit 701. The variator 712 is providing power via the motor generator 706 to the battery 716 and also to the prime mover 714. The variator 712 is shown boosting the prime mover 714 to allow the prime mover 714 to continue to power other loads connected to the prime mover 714. As shown, the clutch 710 is in the third position 728, connecting the second node 720 of the epicyclic gear set 711 to the motor-generator 706.

Figure 30:
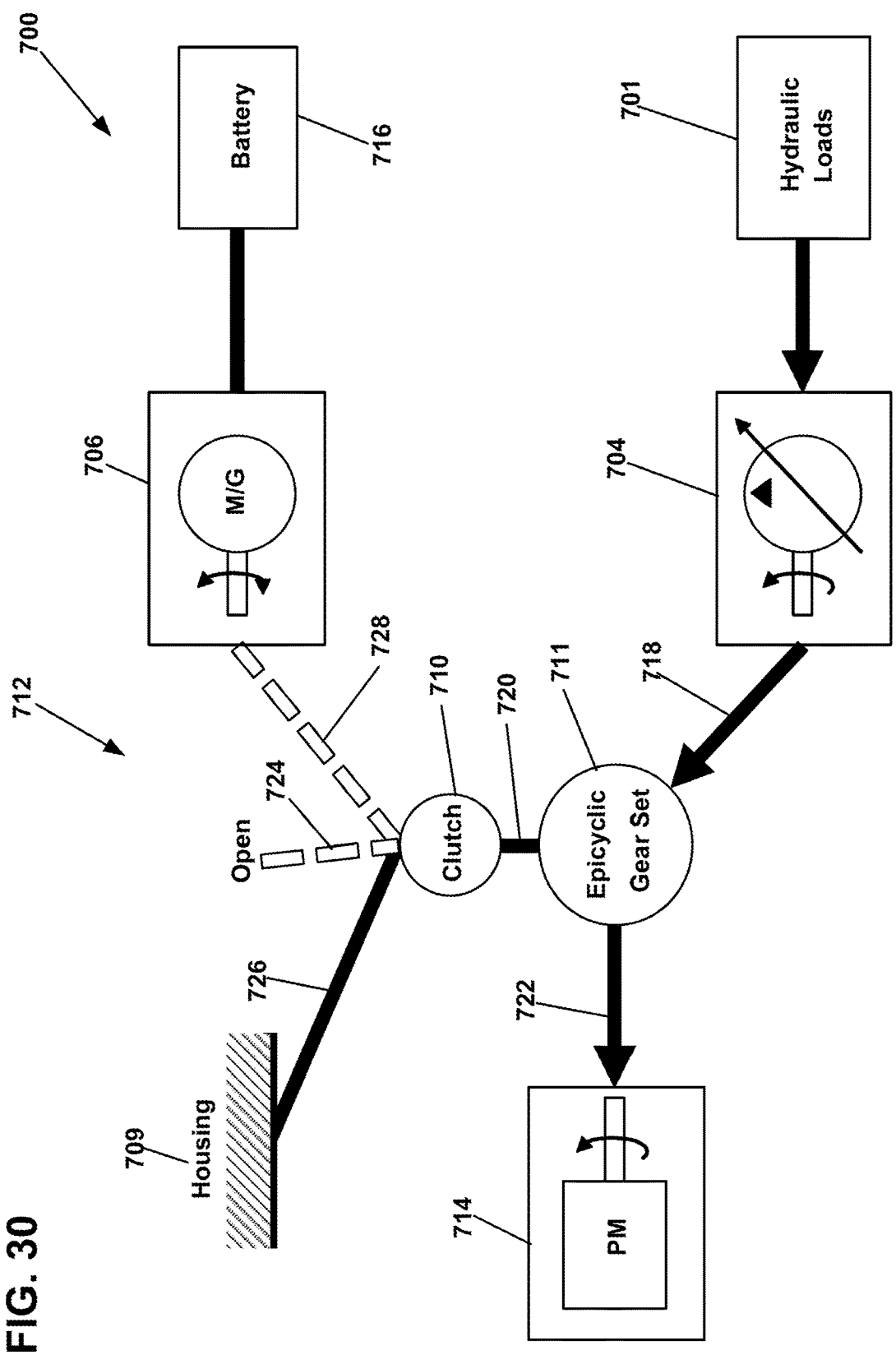

FIG. 30 depicts mode 10 of system 700. Power is provided to the variator 712, via the pump 704, by overrunning power existing in the hydraulic circuit 701. The variator 712 is providing power to the prime mover 714 to allow the prime mover 714 to continue to power other loads connected to the prime mover 714. As shown, the clutch 710 is in the second position 726, connecting the second node 720 of the epicyclic gear set 711 to the housing 709, or a fixed surface. The system 700 is operating at a fixed speed ratio between the pump 704 and the prime mover 714 due to the clutch 710 being connected to a fixed surface. In some embodiments, torque delivered to the prime mover 714 from the variator 712 is controlled by changing pump 704's displacement.

Figure 31:
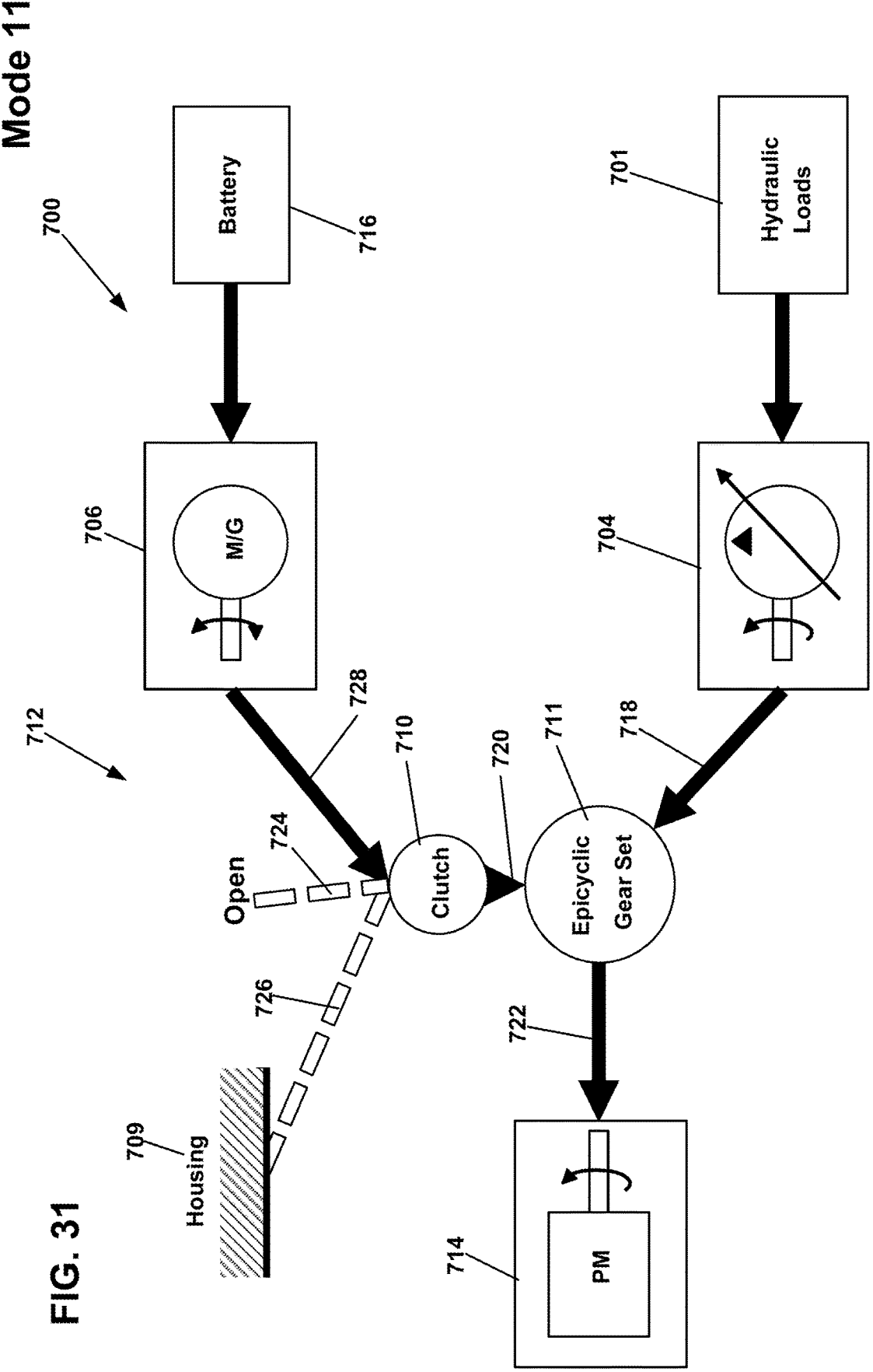

FIG. 31 depicts mode 11 of system 700. As shown, the system 700 is experiencing a high load period of load leveling. The battery 716 is providing power via the motor-generator 706, and the hydraulic circuit 701, via the pump 704, is also providing power to the variator 712. The variator 712 is providing power to the prime mover 714 to allow the prime mover 714 to continue to power other loads connected to the prime mover 714. As shown, the clutch 710 is in the third position 728, connecting the second node 720 of the epicyclic gear set 711 to the motor-generator 706.

Figure 32:
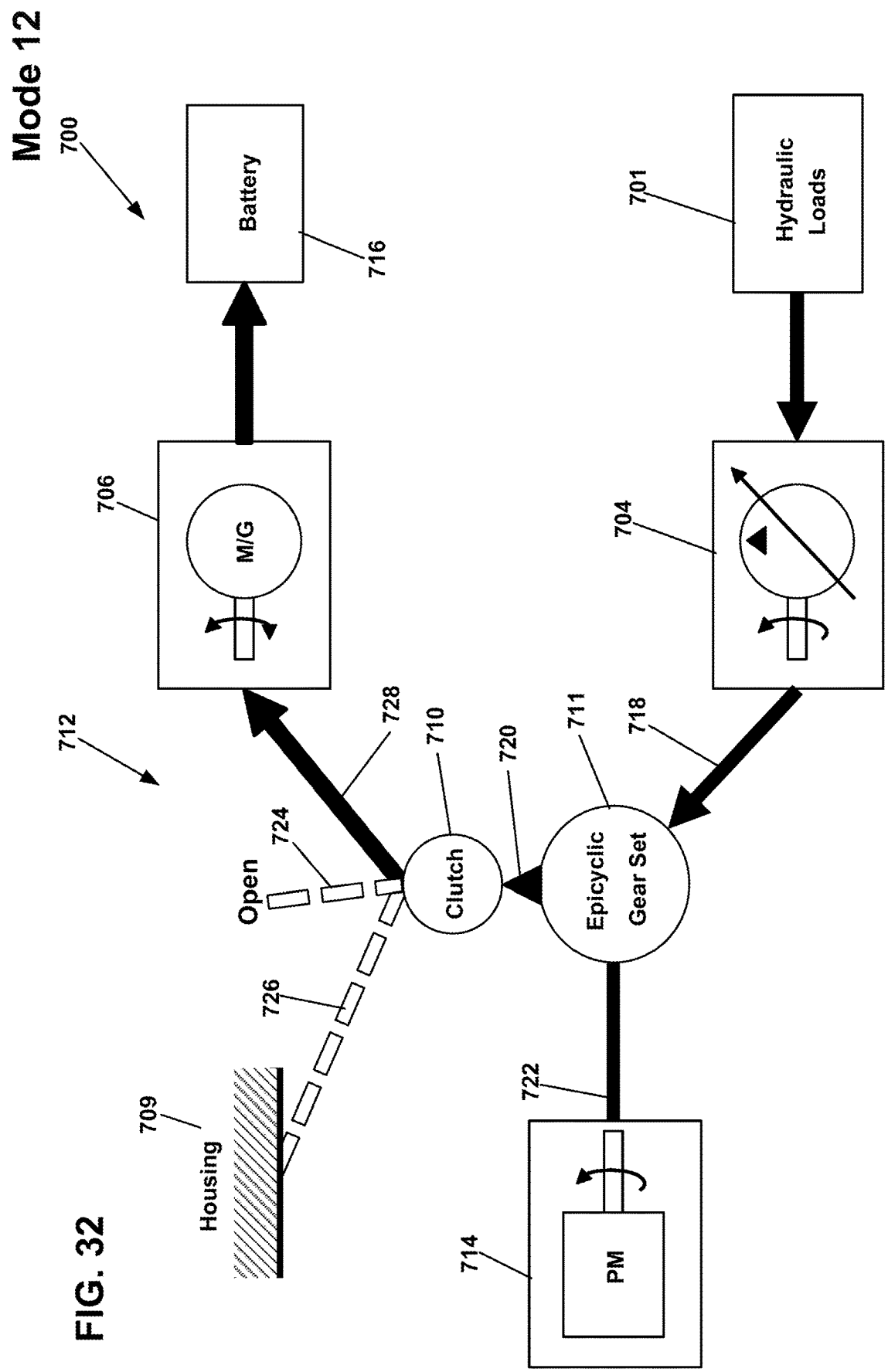

FIG. 32 depicts mode 12 of system 700. As shown, the system 700 is experiencing a low load period of load leveling. Power is provided to the variator 712, via the pump 704, by overrunning power existing in the hydraulic circuit 701. The variator 712 is providing electricity, via the motor-generator 706, for storage in the battery 716. As shown, the clutch 710 is in the third position 728, connecting the second node 720 of the epicyclic gear set 711 to the motor-generator 706.

Figure 33:
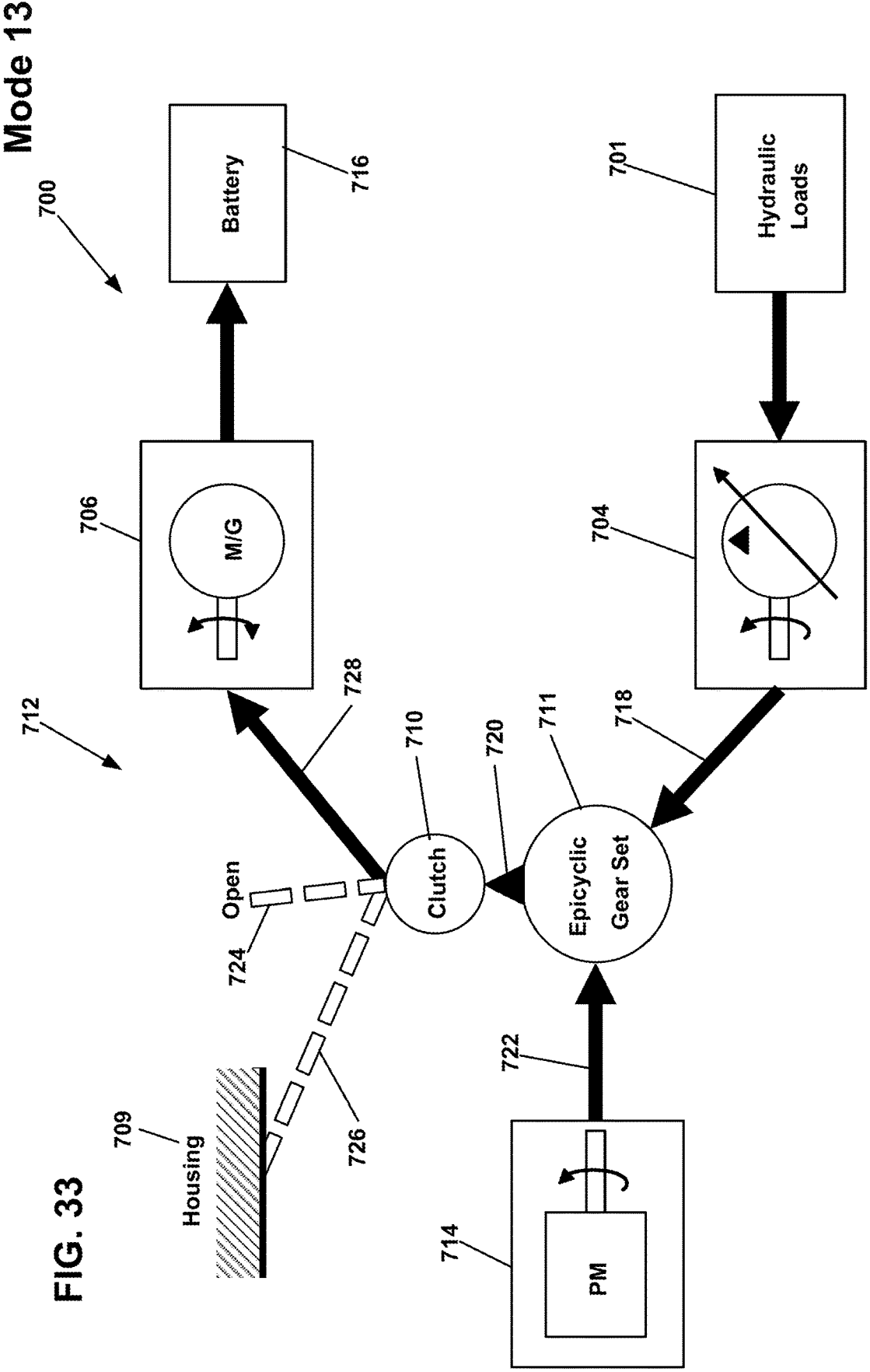

FIG. 33 depicts mode 13 of system 700. As shown, the system 700 is experiencing a low load period of load leveling. The prime mover 714 is providing power to the variator 712. Power is also provided to the variator 712, via the pump 704, by overrunning power existing in the hydraulic circuit 701. The variator 712 is outputting power via electricity, by way of the motor-generator 706, to store in the battery 716. As shown, the clutch 710 is in the third position 728, connecting the second node 720 of the epicyclic gear set 711 to the motor-generator 706.

The systems described above can be used in a variety of different applications. Specifically, the system is well suited for machines that include a rotary mechanical load and a linear mechanical load. Such applications can include, but are not limited to, mobile pieces of machinery such as excavators, wheel loaders, tractors, concrete boom trucks, and forestry equipment. The rotary load for each machine can be a swinging/slewing load, a propelling load, or other similar load. The linear load for each machine can be a boom/lifting actuator(s) load or other similar loads.

The various examples described above are provided by way of illustration only and should not be construed to limit the claims attached hereto. Those skilled in the art will readily recognize various modifications and changes that may be made without following the example examples and applications illustrated and described herein, and without departing from the true spirit and scope of the following claims.

EXAMPLES

Example 1. In any of the examples disclosed herein, a variator includes an epicyclic gear set that has at least three nodes. The variator includes a pumping unit connected to a first node of the epicyclic gear set. The variator includes a clutch connected to a second node of the epicyclic gear set. The clutch is selectively movable between three positions. When in the first position, the clutch allows the second node to freewheel. When in the second position, the clutch connects the second node to a fixed surface. When in the third position, the clutch connects the second node to an electric motor. The variator includes a receiver connected to the third node of the epicyclical gear set. The receiver is configured to receive a drive shaft.

Example 2. In any of the examples disclosed herein, the variator can further include a housing. The epicyclic gear set is positioned within the housing. The clutch connects the second node to the fixed surface and the fixed surface is the housing.

Example 3. In any of the examples disclosed herein, the pumping unit is positioned within the housing.

Example 4. In any of the examples disclosed herein, the epicyclic gear set is a planetary gear set that includes at least a sun gear, a ring gear, and a planetary carrier.

Example 5. In any of the examples disclosed herein, the pumping unit is both a pump and a motor. The pumping unit is configured to both transform mechanical power to hydraulic power and also transform hydraulic power to mechanical power.

Example 6. In any of the examples disclosed herein, the electric motor includes a stator positioned around a rotatable rotor and the rotatable rotor is positioned around the pumping unit.

Example 7. In any of the examples disclosed herein, the electric motor includes a rotatable rotor positioned around a stator, and the stator is positioned around the pumping unit.

Example 8. In any of the examples disclosed herein, the variator includes a housing. The epicyclic gear set and the pumping unit are positioned within the housing and the electric motor includes a stator positioned around a rotatable rotor. The electric motor is positioned external of the housing.

Example 9. In any of the examples disclosed herein, the pumping unit is an axial hydraulic piston pump that has a pump shaft, a swash plate, and a rotating group. The rotating group has a plurality of pistons connected to the swash plate for varying the angle of the swash plate.

Example 10. In any of the examples disclosed herein, the variator includes a first configuration. When in the first configuration, the second node receives power from the electric motor and/or the third node receives power from the input/output shaft to allow an input speed of a pump shaft of the pumping unit at the first node to be varied.

Example 11. In any of the examples disclosed herein, the variator includes a second configuration. When in the second configuration, the second node receives power from the electric motor and/or the first node receives power from the pumping unit to control the output speed of the input/output shaft at the third node.

Example 12. In any of the examples disclosed herein, the variator includes a third configuration. When in the third configuration, the first node receives power from the pumping unit and/or the third node receives power from the input/output shaft to operate the electric motor at the second node as a generator and generate electricity.

Example 13. In any of the examples disclosed herein, the variator includes a housing and a planetary gear set positioned within the housing. The planetary gear set has at least a sun gear, a ring gear, and a planetary carrier. The variator includes an axial hydraulic piston pump that has a variable displacement and is connected to the planetary carrier of the planetary gear set. The axial hydraulic piston pump has a pump shaft, a swash plate, and a rotating group. The rotating group has a plurality of pistons connected to the swash plate for varying the angle of the swash plate. The axial hydraulic piston pump is positioned within the housing. The variator includes an electric motor positioned within the housing. The electric motor has a stator and a rotatable rotor. The rotatable rotor is positioned around the axial hydraulic piston pump within the housing. The variator includes a clutch that is connected to the ring gear of the planetary gear set. The clutch is selectively movable between three positions. When in the first position, the clutch allows the ring gear to freewheel. When in the second position, the clutch connects the ring gear to the housing of the variator. When in the third position, the clutch connects the ring gear to the rotor of the electric motor. The variator includes a receiver connected to the sun gear of the planetary gear set. The receiver is configured to receive a drive shaft.

Example 14. In any of the examples disclosed herein, the stator is positioned around a rotatable rotor.

Example 15. In any of the examples disclosed herein, the rotatable rotor is positioned around the stator.

Example 16. In any of the examples disclosed herein, the rotor includes a plurality of magnets and the stator includes a plurality of conductors.

Example 17. In any of the examples disclosed herein, the stator is at least partially in contact with a hydraulic oil within the housing.

Example 18. In any of the examples disclosed herein, the electric motor is an electric motor-generator.

Example 19. In any of the examples disclosed herein, the variator includes a housing and a planetary gear set positioned within the housing. The planetary gear set has at least a sun gear, a ring gear, and a planetary carrier. The variator includes an axial hydraulic piston pump that has a variable displacement and is connected to the planetary carrier of the planetary gear set. The axial hydraulic piston pump has a pump shaft, a swash plate, and a rotating group. The rotating group has a plurality of pistons connected to the swash plate for varying the angle of the swash plate. The axial hydraulic piston pump is positioned within the housing. The variator includes an electric motor-generator that has a stator positioned around a rotatable rotor. The electric motor-generator is positioned external of the housing. The variator includes a clutch that is connected to the ring gear of the planetary gear set. The clutch is selectively movable between three positions. When in the first position, the clutch allows the ring gear to freewheel. When in the second position, the clutch connects the ring gear to the housing of the variator. When in the third position, the clutch connects the ring gear to the rotor of the electric motor. The variator includes a receiver connected to the sun gear of the planetary gear set. The receiver is configured to receive a drive shaft.

Example 20. In any of the examples disclosed herein, the rotor includes a plurality of magnets and the stator includes a plurality of conductors.

Example 21. In any of the examples disclosed herein, a motor energy recovery system includes an electric storage device used to store an electric charge, a hydraulic circuit, and a variator. The variator includes an epicyclic gear set that has at least three nodes. The variator includes a pump connected to a first node of the epicyclic gear set. The pump has a first side that fluidly connects to the hydraulic circuit and a second side that fluidly connects to a tank. The variator includes a motor-generator connected to the electric storage device. The motor-generator is connectable to the epicyclic gear set. The variator includes a clutch connected to a second node of the epicyclic gear set. The clutch is selectively movable between three positions. When in a first position, the clutch allows the second node to freewheel. When in a second position, the clutch connects the second node to a fixed surface. When in a third position, the clutch connects the second node to the motor-generator. The motor energy recovery system includes a rotational load connected to the third node of the epicyclic gear set of the variator. The variator is configured to receive energy from the hydraulic circuit, the rotational load, and the electric storage device, and the variator is also configured to output energy to the hydraulic circuit, the rotational load, and the electric storage device.

Example 22. In any of the examples disclosed herein, further including a control system in communication with the variator to alter the behavior of the variator between a plurality of operating modes.

Example 23. In any of the examples disclosed herein, a plurality of operating modes alter whether the variator receives energy from the hydraulic circuit, the rotational load, and/or the electric storage device and outputs energy to the hydraulic circuit, the rotational load, and/or the electric storage device.

Example 24. In any of the examples disclosed herein, the control system is in communication with the clutch to alter the position of the clutch between the first, second, and third positions.

Example 25. In any of the examples disclosed herein, further including a main pump being in fluid communication with at least one hydraulic system load.

Example 26. In any of the examples disclosed herein, further including a control valve. The control valve receives hydraulic fluid flow from the main pump and directs it to the at least one hydraulic system load.

Example 27. In any of the examples disclosed herein, further including a second hydraulic system load in fluid communication with the control valve. The second hydraulic system load is a linear mechanical load.

Example 28. In any of the examples disclosed herein, further including a mode valve selectively movable between a first sub-mode and a second sub-mode. When in the first mode, the variator simultaneously drives the rotational load and supplies fluid flow to the control valve. When in the second sub-mode, the variator simultaneously drives the rotational load and the at least one hydraulic system load.

Example 29. In any of the examples disclosed herein, when in the second sub-mode, the control valve places the main pump and the at least one hydraulic system load in fluid communication so that the main pump can provide hydraulic energy to the at least one hydraulic system load.

Example 30. In any of the examples disclosed herein, the rotational load is a prime mover. The variator provides a load leveling function that permits the prime mover to be run at a consistent operating condition.

Example 31. In any of the examples disclosed herein, the load leveling function of the variator includes storing energy in a battery during periods of low loading on the prime mover.

Example 32. In any of the examples disclosed herein, the load leveling function of the variator includes releasing the stored energy from the battery to power the variator during periods of high loading of the prime mover.

Example 33. In any of the examples disclosed herein, a motor energy recovery system includes a battery and a hydraulic circuit. The hydraulic circuit includes a main pump being in fluid communication with at least one linear mechanical load. The motor energy recovery system includes a variator. The variator includes an epicyclic gear set that has at least three nodes. The variator includes a pump connected to a first node of the epicyclic gear set. The pump has a first side that fluidly connects to the hydraulic circuit and a second side that fluidly connects to a tank. The variator includes a motor-generator connected to an electric storage device. The motor-generator is connectable to the epicyclic gear set. The variator includes a clutch connected to a second node of the epicyclic gear set. The clutch is selectively movable between three positions. When in a first position, the clutch allows the second node to freewheel. When in a second position, the clutch connects the second node to a fixed surface. When in the third position, the clutch connects the second node to the motor-generator. The motor energy recovery system includes a rotary mechanical load connected to the third node of the epicyclic gear set of the variator. The variator is configured to receive energy from the hydraulic circuit, the rotary mechanical load, and the battery. The variator is configured to output energy to the hydraulic circuit, the rotary mechanical load, and the battery.

Example 34. In any of the examples disclosed herein, further including a control system in communication with the variator to alter the behavior of the variator between a plurality of operating modes.

Example 35. In any of the examples disclosed herein, the plurality of operating modes alter whether the variator receives energy from the hydraulic circuit, the rotary mechanical load, and/or the battery and outputs energy to the hydraulic circuit, the rotary mechanical load, and/or the battery.

Example 36. In any of the examples disclosed herein, the control system is in communication with the clutch to alter the position of the clutch between the first, second, and third positions.

Example 37. In any of the examples disclosed herein, further including a control valve and a mode valve. The control valve receives hydraulic fluid flow from the main pump and directs it to the at least one linear mechanical load. The mode valve is selectively movable between a first sub-mode and a second sub-mode. When in the first mode, the variator simultaneously drives the rotational load and supplies fluid flow to the control valve. When in the second sub-mode, the variator simultaneously drives the rotary mechanical load and the at least one linear mechanical load.

Example 38. In any of the examples disclosed herein, when in the in the second sub-mode, the control valve places the main pump and the at least one linear mechanical load in fluid communication so that the main pump can provide hydraulic energy to the at least one linear mechanical load.

Example 39. In any of the examples disclosed herein, a motor energy recovery system includes a battery and a hydraulic circuit. The hydraulic circuit includes a main pump being in fluid communication with at least one linear mechanical load. The motor energy recovery system includes a variator. The variator includes an epicyclic gear set that has at least three nodes. The variator includes a pump connected to a first node of the epicyclic gear set. The pump has a first side that fluidly connects to the hydraulic circuit and a second side that fluidly connects to a tank. The variator includes a motor-generator connected to an electric storage device. The motor-generator is connectable to the epicyclic gear set. The variator includes a clutch connected to a second node of the epicyclic gear set. The clutch is selectively movable between three positions. When in a first position, the clutch allows the second node to freewheel. When in a second position, the clutch connects the second node to a fixed surface. When in the third position, the clutch connects the second node to the motor-generator. The motor energy recovery system includes a prime mover connected to the third node of the epicyclic gear set of the variator. The variator is configured to receive energy from the hydraulic circuit, the prime mover, and the battery. The variator is configured to output energy to the hydraulic circuit, the prime mover, and the battery. The motor energy recovery system includes a control system in communication with the variator to alter the behavior of the variator between a plurality of operating modes. The plurality of operating modes alter whether the variator receives energy from the hydraulic circuit, the prime mover, and/or electric storage device and outputs Example 40. In any of the examples disclosed herein, the control system is in communication with the clutch to alter the position of the clutch between the first, second, and third positions.

Example 41. In any of the examples disclosed herein, the variator provides a load leveling function that permits the prime mover to be run at a consistent operating condition, wherein the load leveling function of the variator includes storing energy in the battery during periods of low loading on the prime mover, releasing the stored energy from the battery to power the variator during periods of high loading of the prime mover.

PARTS LIST

100 Variator
102 Epicyclic gear set
104 Variator pump
106 Motor-generator
108 Clutch
110 First node
112 Second node
114 Third node
113 Control System
115 Input/output shaft
116 First position
118 Second position
120 Third position
121 Receiver
200 Variator
202 Epicyclic/planetary gear set
204 Variator pump
206 Motor-generator
208 Clutch
209 Housing
210 Swash plate
212 Rotating group
214 Pump shaft
216 Stator
218 Rotor
220 Sun gear
221 Receiver
222 Planetary carrier
224 Ring gear
300 Variator
302 Epicyclic/planetary gear set
304 Variator pump
306 Motor-generator
308 Clutch
309 Housing
310 Swash plate
312 Rotating group
314 Pump shaft
316 Stator
318 Rotor
320 Sun gear
321 Receiver
322 Planetary carrier
324 Ring gear
400 Variator
402 Epicyclic/planetary gear set
404 Variator pump
406 Motor-generator
408 Clutch
409 Housing
410 Swash plate
412 Rotating group
414 Pump shaft
416 Stator
418 Rotor
420 Sun gear
421 Receiver
422 Planetary carrier
424 Ring gear
500 Energy recovery system
501 Variator
502 Hydraulic circuit
504 Variator pump
506 Motor-generator
508 Battery
510 Clutch
512 Epicyclic gear set
513 Control system
514 First side of variator pump
516 Second side of variator pump
518 Tank
520 First node
522 Second node
524 Third node
526 Rotational load
600 Energy recovery system
601 Hydraulic circuit
602 Main pump
603 Control system
604 Direction control valve
606 General hydraulic system load
608 Linear mechanical load
610 Mode valve
612 Variator
614 Rotary mechanical load
616 Battery
700 Energy recovery system
701 Hydraulic circuit
703 Control system
704 Variator pump
706 Motor-generator
709 Housing
710 Clutch
711 Epicyclic gear set
712 Variator
714 Prime mover
716 Battery
718 First node
720 Second node
722 Third node
724 First position of clutch
726 Second position of clutch
728 Third position of clutch

We claim:

1. A variator comprising:
a housing;
a planetary gear set positioned within the housing, the planetary gear set having at least a sun gear, a ring gear, and a planetary carrier;
an axial hydraulic piston pump having a variable displacement and being connected to the planetary carrier of the planetary gear set, the axial hydraulic piston pump having a pump shaft, a swash plate, and a rotating group, the rotating group having a plurality of pistons connected to the swash plate for varying the angle of the swash plate, the axial hydraulic piston pump being positioned within the housing;
an electric motor positioned within the housing, the electric motor having a stator and a rotatable rotor, wherein the rotatable rotor is positioned around the axial hydraulic piston pump within the housing; and
a clutch being connected to the ring gear of the planetary gear set, the clutch being selectively movable between three positions, wherein, when in a first position, the clutch allows the ring gear to freewheel, when in a second position, the clutch connects the ring gear to the housing of the variator, and when in a third position, the clutch connects the ring gear to the rotatable rotor of the electric motor.

2. The variator of claim 1, wherein the stator is positioned around a rotatable rotor.

3. The variator of claim 1, wherein the rotatable rotor is positioned around the stator.

4. The variator of claim 1, wherein the rotor includes a plurality of magnets and the stator includes a plurality of conductors.

5. The variator of claim 1, wherein the stator is at least partially in contact with a hydraulic oil within the housing.

6. The variator of claim 1, wherein the electric motor is an electric motor-generator.

\* \* \* \* \*